(12) United States Patent
Hirukawa et al.

(10) Patent No.: US 10,260,569 B2
(45) Date of Patent: Apr. 16, 2019

(54) FIXED-TYPE CONSTANT VELOCITY UNIVERSAL JOINT

(71) Applicants: Hiroyasu Hirukawa, Shizuoka (JP); Teruaki Fujio, Shizuoka (JP)

(72) Inventors: Hiroyasu Hirukawa, Shizuoka (JP); Teruaki Fujio, Shizuoka (JP)

(73) Assignee: NTN CORPORATION, Osaka (JP)

( * ) Notice: Subject to any disclaimer, the term of this patent is extended or adjusted under 35 U.S.C. 154(b) by 682 days.

(21) Appl. No.: 14/899,850

(22) PCT Filed: May 26, 2014

(86) PCT No.: PCT/JP2014/063858
§ 371 (c)(1),
(2) Date: Dec. 18, 2015

(87) PCT Pub. No.: WO2014/208242
PCT Pub. Date: Dec. 31, 2014

(65) Prior Publication Data
US 2016/0138660 A1     May 19, 2016

(30) Foreign Application Priority Data

Jun. 26, 2013  (JP) .................................. 2013-133808

(51) Int. Cl.
*F16D 3/224*   (2011.01)
*F16D 3/223*   (2011.01)
*F16D 3/2245*  (2011.01)

(52) U.S. Cl.
CPC .......... *F16D 3/2245* (2013.01); *F16D 3/223* (2013.01); *F16D 3/224* (2013.01); *F16D 2003/22303* (2013.01); *F16D 2003/22309* (2013.01)

(58) Field of Classification Search
CPC ........ F16D 3/2245; F16D 3/223; F16D 3/224; F16D 2003/22309; F16D 2003/22306; F16D 2003/22303
See application file for complete search history.

(56) References Cited

U.S. PATENT DOCUMENTS 5,692,960 A * 12/1997 Sugiyama ............. F16D 3/2237
                                                      464/145
5,853,328 A * 12/1998 Kobayashi .............. F16D 3/223
                                                      464/145
(Continued)

FOREIGN PATENT DOCUMENTS

JP    3-255226    11/1991
JP    9-280261    10/1997
(Continued)

OTHER PUBLICATIONS

International Search Report dated Aug. 26, 2014 in International (PCT) Application No. PCT/JP2014/063858.
(Continued)

*Primary Examiner* — Matthieu F Setliff
(74) *Attorney, Agent, or Firm* — Wenderoth, Lind & Ponack, L.L.P.

(57) ABSTRACT

A fixed type constant velocity universal joint of a track groove crossing type has track grooves of an inner joint member formed so as to be mirror-image symmetrical with the paired track grooves of an outer joint member with respect to a joint center plane at an operating angle of 0°. The track grooves of both the joint members each have a length corresponding to a maximum operating angle required for a rear-wheel drive shaft. Further, each axial clearance between the inner joint member and the cage is set larger than an axial clearance formed by a ball track clearance between each of balls and each track groove.

8 Claims, 19 Drawing Sheets

(56) References Cited

U.S. PATENT DOCUMENTS

| | | | | |
|---|---|---|---|---|
| 6,227,979 | B1* | 5/2001 | Yamamoto | F16D 3/2245 464/144 |
| 6,468,164 | B2* | 10/2002 | Song | F16D 3/2237 464/144 |
| 7,097,567 | B2* | 8/2006 | Kobayashi | F16D 3/2237 464/145 |
| 7,112,140 | B2* | 9/2006 | Weckerling | F16D 3/223 464/145 |
| 7,214,134 | B2* | 5/2007 | Nakagawa | F16D 3/2237 464/145 |
| 7,704,149 | B2* | 4/2010 | Yamazaki | F16D 3/2245 464/145 |
| 7,810,407 | B2* | 10/2010 | Ishijima | B62D 1/20 464/906 |
| 8,070,611 | B2* | 12/2011 | Wormsbaecher | F16D 3/223 464/144 |
| 8,162,764 | B2* | 4/2012 | Ishijima | F16D 3/223 464/145 |
| 8,568,245 | B2* | 10/2013 | Fujio | F16D 3/224 464/144 |
| 8,808,097 | B2* | 8/2014 | Fujio | F16D 3/224 464/144 |
| 9,169,877 | B2* | 10/2015 | Hirukawa | F16D 3/2233 |
| 9,255,611 | B2* | 2/2016 | Fujio | F16D 3/2245 |
| 9,551,382 | B2* | 1/2017 | Hirukawa | F16D 3/2233 |
| 2002/0098894 | A1* | 7/2002 | Krude | F16D 3/223 464/145 |
| 2003/0017877 | A1* | 1/2003 | Kobayashi | F16D 3/2237 464/145 |
| 2004/0180725 | A1* | 9/2004 | Krude | F16D 3/223 464/145 |
| 2005/0261067 | A1* | 11/2005 | Kobayashi | F16D 3/2237 464/145 |
| 2008/0051203 | A1* | 2/2008 | Ishijima | B62D 1/20 464/143 |
| 2008/0096678 | A1* | 4/2008 | Yamazaki | F16D 3/2245 464/145 |
| 2008/0214317 | A1* | 9/2008 | Weckerling | F16D 1/101 464/162 |
| 2008/0248884 | A1* | 10/2008 | Ishijima | F16D 3/223 464/141 |
| 2010/0035696 | A1* | 2/2010 | Weckerling | F16D 1/101 464/145 |
| 2010/0292016 | A1* | 11/2010 | Wormsbaecher | F16D 3/223 464/144 |
| 2011/0212789 | A1* | 9/2011 | Ooba | F16D 3/2233 464/145 |
| 2012/0165105 | A1* | 6/2012 | Fujio | F16D 3/224 464/145 |
| 2014/0038733 | A1* | 2/2014 | Fujio | F16D 3/224 464/144 |
| 2015/0316108 | A1* | 11/2015 | Hirukawa | F16D 3/2233 464/145 |
| 2016/0138660 | A1* | 5/2016 | Hirukawa | F16D 3/223 464/144 |

FOREIGN PATENT DOCUMENTS

| | | | | |
|---|---|---|---|---|
| JP | 2005-106233 | | 4/2005 | |
| JP | 2009-250365 | | 10/2009 | |
| JP | 2013-104462 | | 5/2013 | |
| WO | WO-2011043268 | A1 * | 4/2011 | F16D 3/224 |

OTHER PUBLICATIONS

International Preliminary Report on Patentability and Written Opinion of the International Searching Authority dated Dec. 29, 2015 in International (PCT) Application No. PCT/JP2014/063858.

* cited by examiner

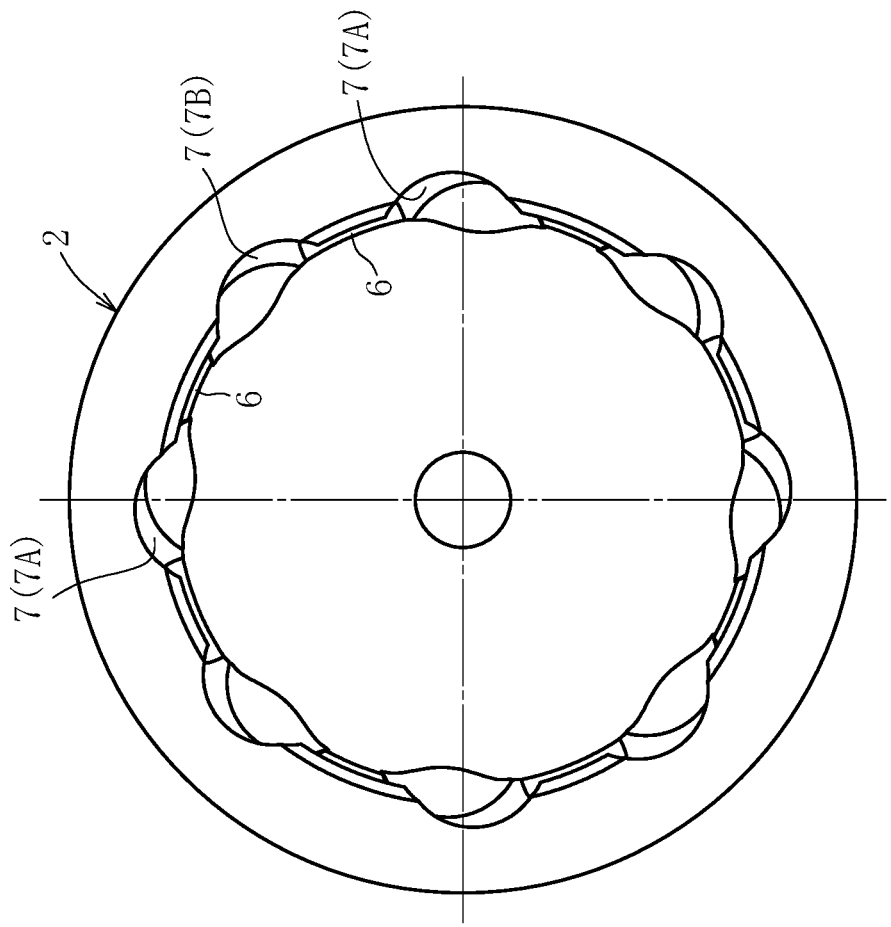
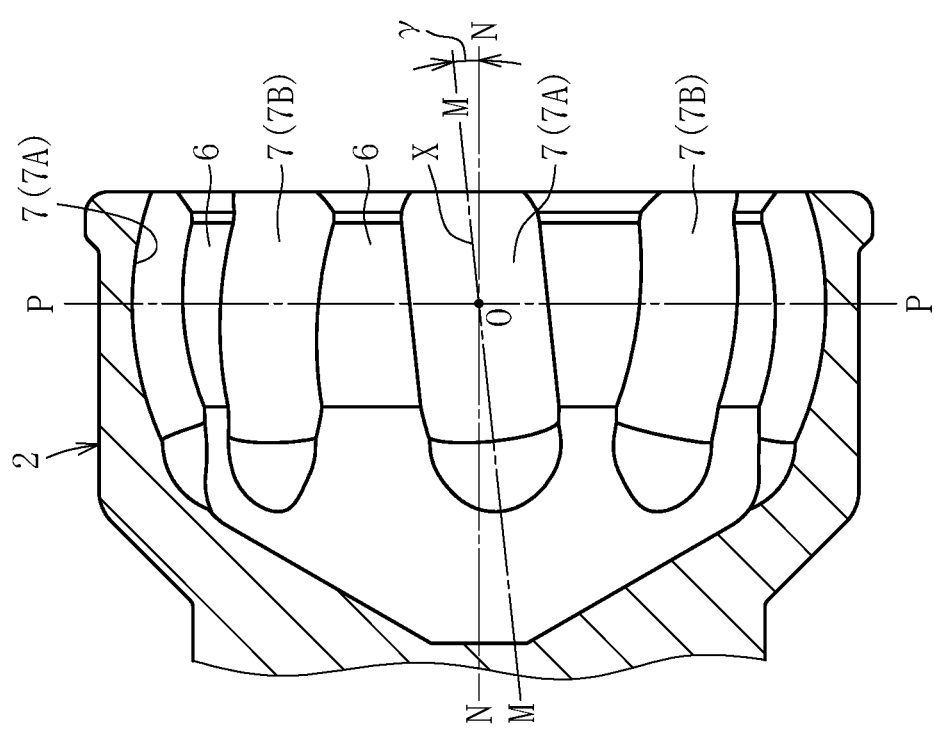

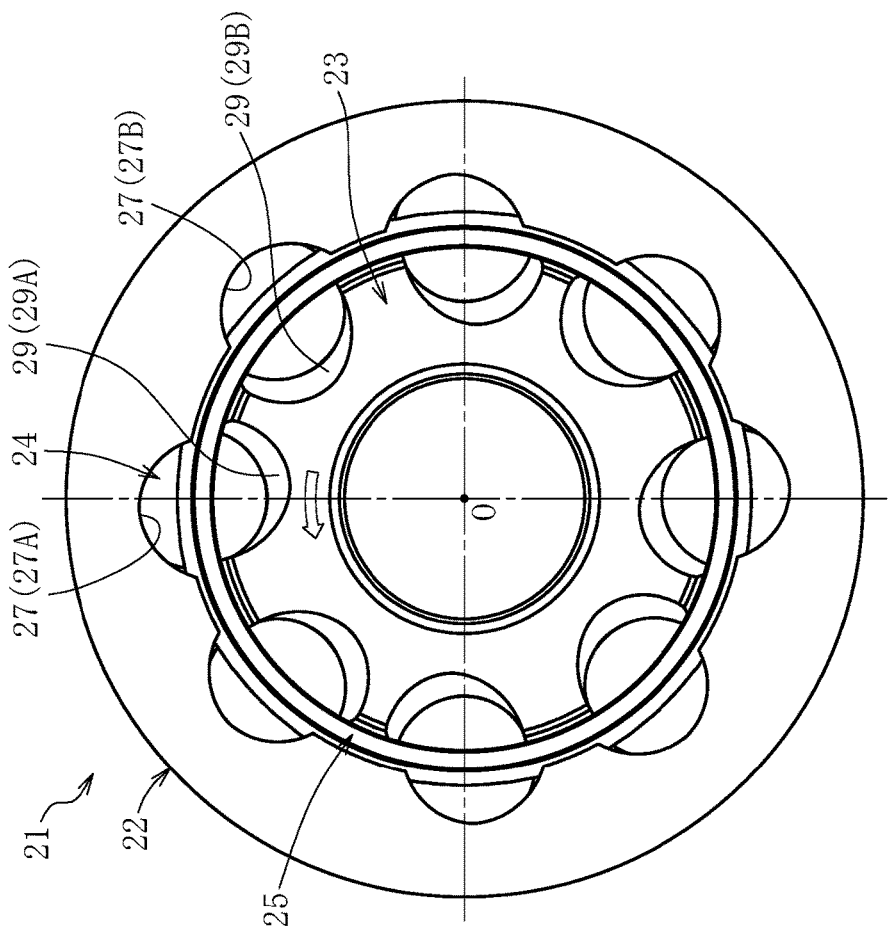
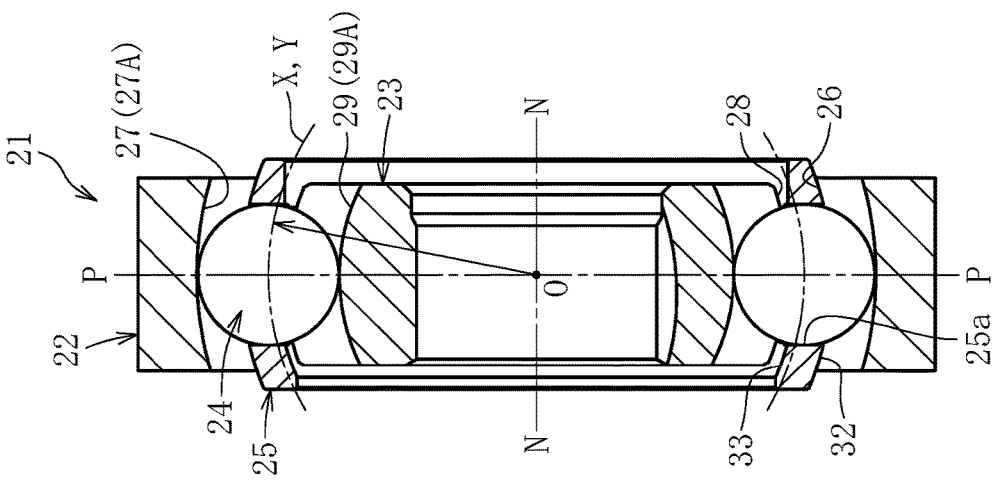

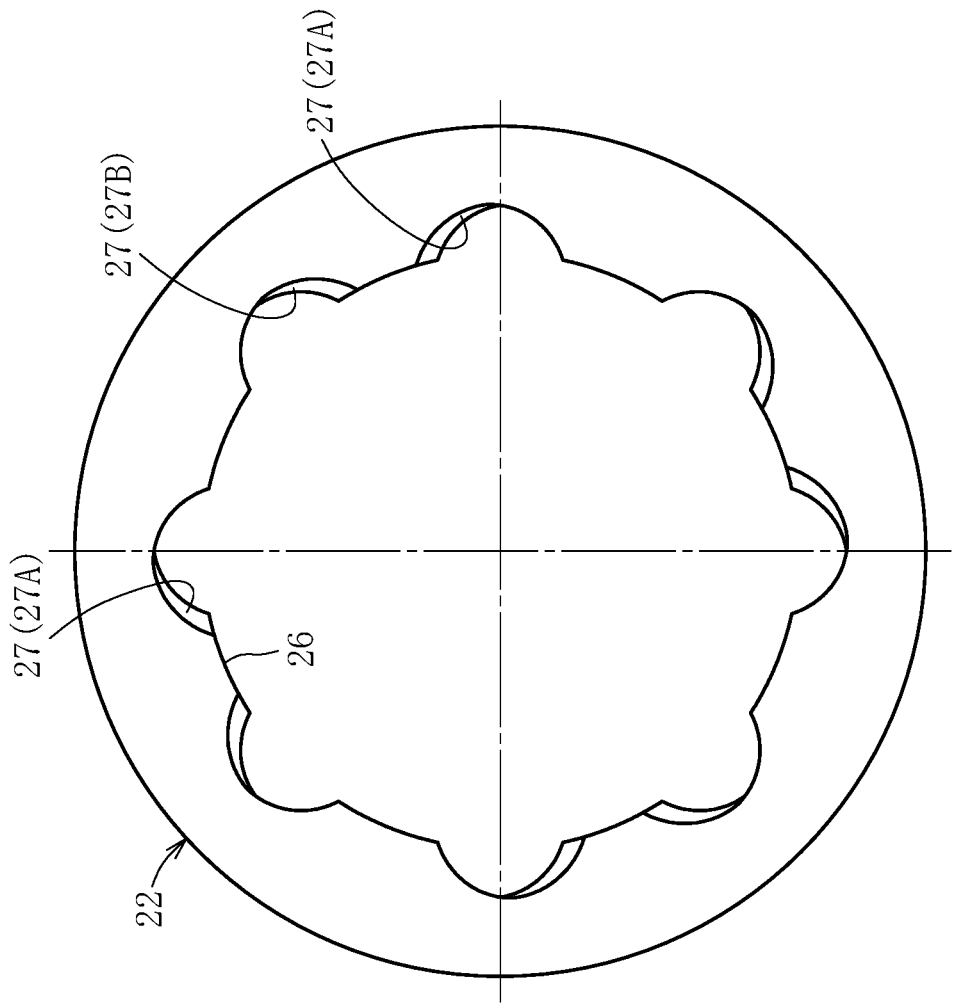
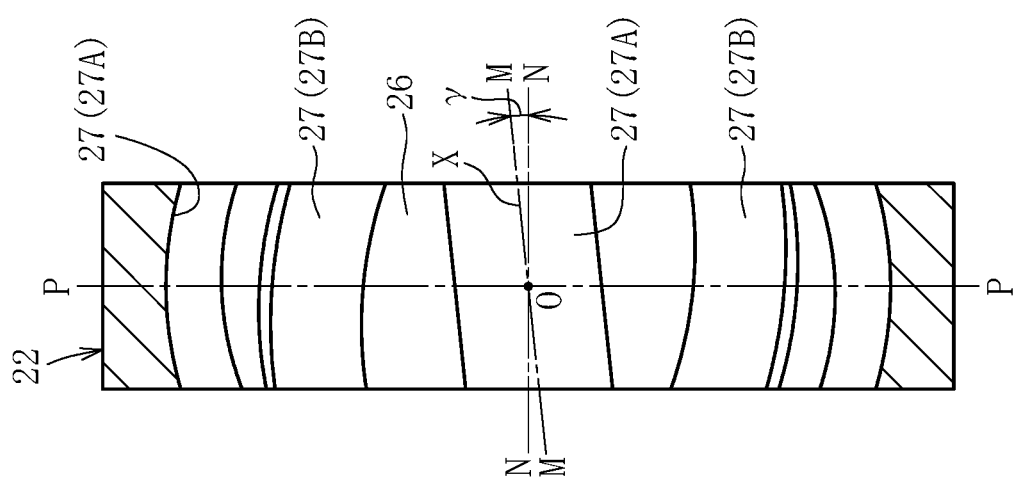

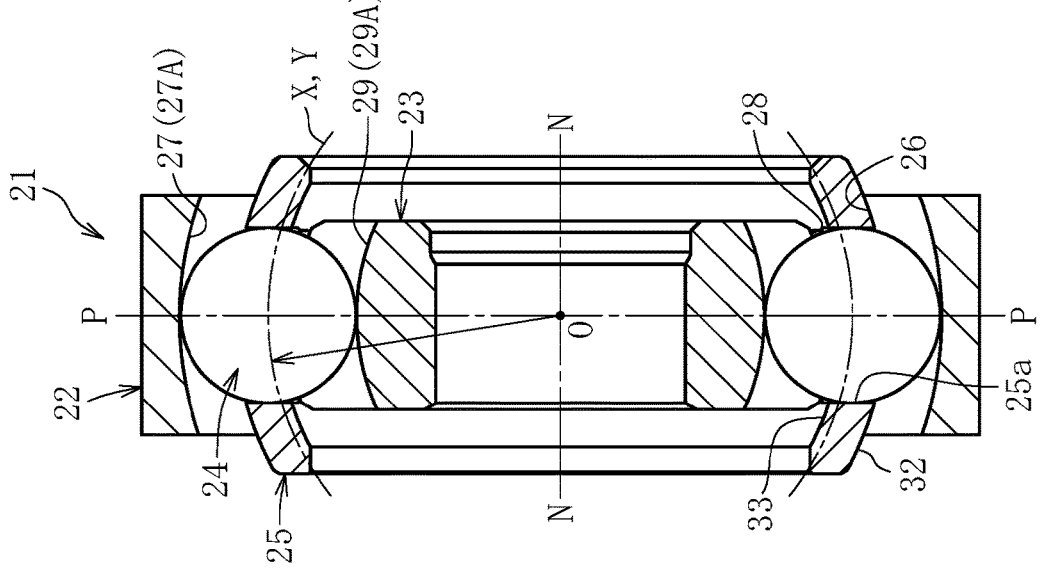
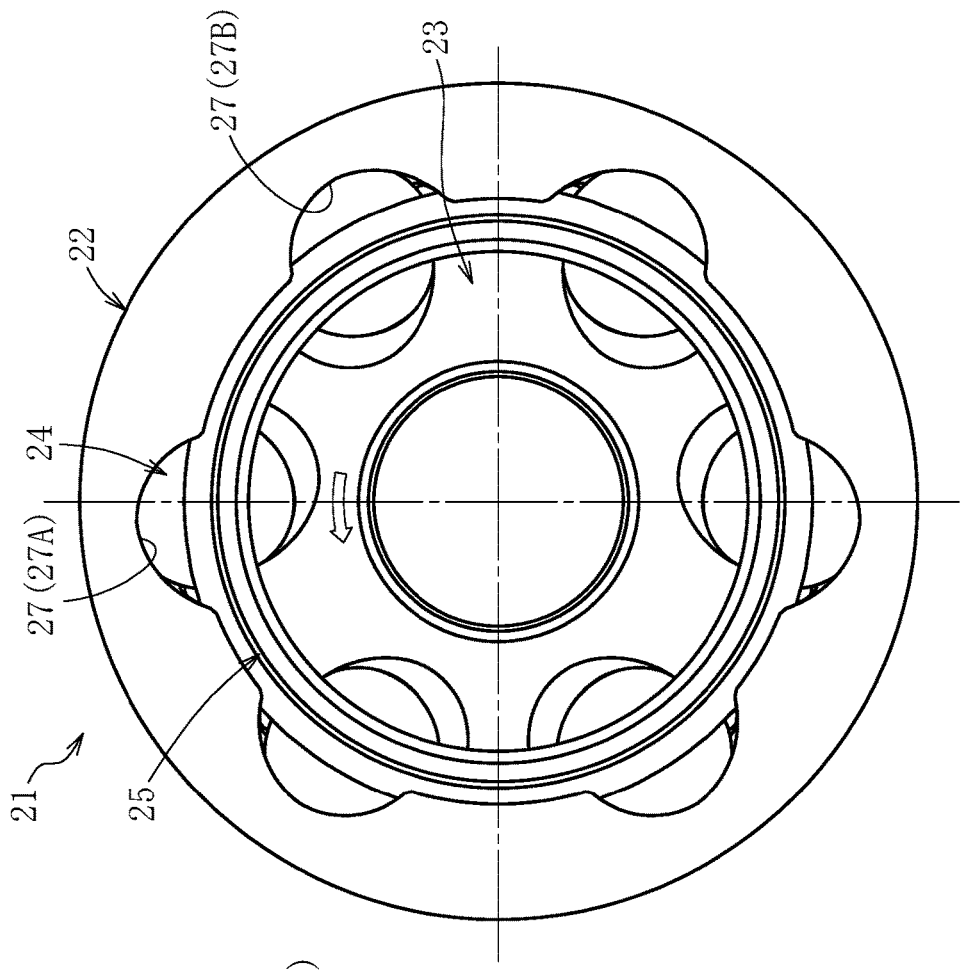
Fig. 21A
Fig. 21B

FIXED-TYPE CONSTANT VELOCITY UNIVERSAL JOINT

TECHNICAL FIELD

The present invention relates to a fixed type constant velocity universal joint to be used in a power transmission system of automobiles and various industrial machines, for allowing only angular displacement between two shafts on a driving side and a driven side. More particularly, the present invention relates to a fixed type constant velocity universal joint to be used in an automotive rear-wheel drive shaft or a propeller shaft.

BACKGROUND ART

As fixed type constant velocity universal joints, there have been publicly known joints of, for example, a so-called six-ball Rzeppa type (BJ) and a six-ball undercut-free type (UJ), and an eight-ball Rzeppa type (EBJ) and an eight-ball undercut-free type (EUJ). Those joints are used as appropriate in accordance with usage, required characteristics, and the like. Further, there have also been proposed various fixed type constant velocity universal joints of a so-called track groove crossing type (for example, Patent Literature 1).

Referring to FIG. 22A and FIG. 22B, description is given of a fixed type constant velocity universal joint of a track groove crossing type disclosed in Patent Literature 1. FIG. 22A is a vertical sectional view of a state in which the fixed type constant velocity universal joint disclosed in Patent Literature 1 forms an operating angle of 0°, and FIG. 22B is a vertical sectional view of a state in which the fixed type constant velocity universal joint forms an operating angle. The constant velocity universal joint 121 includes an outer joint member 122, an inner joint member 123, balls 124, and a cage 125. In the constant velocity universal joint 121, a plurality of (for example, eight) arc-shaped track grooves 127 are formed in a spherical inner peripheral surface 126 of the outer joint member 122. The track grooves 127 are formed so that planes including ball raceway center lines x of the track grooves 127 are inclined with respect to a joint axial line n-n and the track grooves 127 are adjacent to each other in a peripheral direction with their inclination directions opposite to each other (detailed illustration of states of the inclination is omitted). Further, although detailed illustration is omitted, a plurality of arc-shaped track grooves 129 are formed in a spherical outer peripheral surface 128 of the inner joint member 123. The track grooves 129 are formed so as to be mirror-image symmetrical with the paired track grooves 127 of the outer joint member 122 with respect to a plane P including a joint center O at the operating angle of 0°. That is, the inner joint member 123 is assembled to an inner periphery of the outer joint member 122 so that the paired track grooves 127 and 129 cross each other.

As illustrated in FIG. 22A, curvature centers of the arc-shaped track grooves 127 of the outer joint member 122 and the arc-shaped track grooves 129 of the inner joint member 123 are each positioned at the joint center O. Each ball 124 is interposed in a crossing portion between the track groove 127 of the outer joint member 122 and the track groove 129 of the inner joint member 123, which are paired with each other. The balls 124 are held by the cage 125 arranged between the outer joint member 122 and the inner joint member 123. Curvature centers of a spherical outer peripheral surface 132 and a spherical inner peripheral surface 133 of the cage 125 are each positioned at the joint center O. In the constant velocity universal joint 121, the paired track grooves 127 and 129 cross each other, and the balls 124 are interposed in those crossing portions. Therefore, when the joint forms an operating angle, the balls 124 are always guided in a plane bisecting an angle formed between axial lines of the outer joint member 122 and the inner joint member 123. As a result, rotational torque is transmitted at a constant velocity between the two axes.

As described above, the track grooves 127 and 129 of the outer joint member 122 and the inner joint member 123 are adjacent to each other in the peripheral direction with their inclination directions opposite to each other. Therefore, when both the joint members 122 and 123 rotate relative to each other at the operating angle of 0° illustrated in FIG. 22A, forces in the opposite directions are applied from the balls 124 to pocket portions 125a of the cage 125 that are adjacent to each other in the peripheral direction. Due to the forces in the opposite directions, the cage 125 is stabilized at the position of the joint center O. Thus, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. As a result, torque loss and heat generation are suppressed, and the durability is enhanced.

CITATION LIST

Patent Literature 1: JP 2009-250365 A

SUMMARY OF INVENTION

Technical Problem

Incidentally, the fixed type constant velocity universal joint 121 described above is designed for application to automotive drive shafts, specifically, front-wheel drive shafts (more specifically, on its outboard side) that form an especially high operating angle (practical maximum operating angle $\theta$ max of, for example, 40° or more). The track grooves of the fixed type constant velocity universal joint need to have lengths that prevent, even when the joint forms the maximum operating angle $\theta$ max, the balls from dropping off end portions on an opening side of the track grooves of the outer joint member, and end portions on an interior side of the track grooves of the inner joint member. Thus, in the fixed type constant velocity universal joint 121 described above, values of an axial dimension $t_1$ of a mouth portion 122a of the outer joint member 122, an axial dimension $t_2$ from the joint center O to the end portion of the outer joint member 122 on the opening side, an axial dimension $t_3$ of the inner joint member 123, and an axial dimension $t_4$ of the cage 125 are set so that, even when the joint forms the maximum operating angle $\theta$ max, the balls 124 are not disengaged from the track grooves 127 and 129.

On the other hand, operating angles to be formed by fixed type constant velocity universal joints for rear-wheel drive shafts are not as large as those to be formed by fixed type constant velocity universal joints for the front-wheel drive shafts. It is only necessary that an operating angle of approximately 20° be formed during travel of a vehicle. Further, in consideration of a folding angle at the time of mounting the drive shaft to the vehicle, and allowance for up-and-down bounce of the vehicle during travel on rough roads, it is only necessary that a maximum operating angle $\theta$ max of approximately 30° be formed. Operating angles to be formed by fixed type constant velocity universal joints for propeller shafts also are not as large as those to be formed by the fixed type constant velocity universal joints for the front-wheel drive shafts. It is only necessary that an operating angle of approximately 10° be formed during the travel of the vehicle. Further, in consideration of the folding angle at the time of mounting the propeller shaft to the vehicle, and the allowance for the up-and-down bounce of the vehicle during the travel on rough roads, it is only necessary that a maximum operating angle θ max of approximately 20° be formed. Thus, when the design concept of Patent Literature 1 is applied as it is to the fixed type constant velocity universal joint for the rear-wheel drive shaft or the fixed type constant velocity universal joint for the propeller shaft, there arise problems with compactification and weight reduction because the above-mentioned dimensions $t_1$ to $t_4$ are unnecessarily large.

Further, when the fixed type constant velocity universal joint is capable of absorbing vibration with a small amplitude, such as idling vibration that is transmitted into a cabin during stopping of an automobile, the fixed type constant velocity universal joint is capable of contributing to decrease of factors of noise, vibration, and harshness (NVH) of the automobile. However, in Patent Literature 1, the possibility of providing technical means for decreasing the NVH factors of automobiles to the fixed type constant velocity universal joint is not investigated at all. In terms of this, there is room for improvement.

In view of the circumstances, the present invention has an object to provide a compact and lightweight fixed type constant velocity universal joint that is suppressed in torque loss and heat generation, enhanced in efficiency, capable of contributing to decrease of NVH factors, and suited to rear-wheel drive shafts or propeller shafts.

Solution to Problem

According to a first invention, which is devised to attain the above-mentioned object, there is provided a fixed type constant velocity universal joint, comprising: an outer joint member having a spherical inner peripheral surface in which a plurality of track grooves are formed so as to extend in an axial direction of the outer joint member; an inner joint member having a spherical outer peripheral surface in which a plurality of track grooves are formed so as to be paired with the plurality of track grooves of the outer joint member; a plurality of balls for transmitting torque, the plurality of balls being interposed between the plurality of track grooves of the outer joint member and the plurality of track grooves of the inner joint member; and a cage comprising pockets for receiving the balls, the cage having: a spherical outer peripheral surface fitted to the spherical inner peripheral surface of the outer joint member; and a spherical inner peripheral surface fitted to the spherical outer peripheral surface of the inner joint member, wherein the plurality of track grooves of the outer joint member are each formed into an arc shape having a curvature center that is prevented from being offset in the axial direction with respect to a joint center, the plurality of track grooves of the outer joint member being inclined in a peripheral direction of the outer joint member with respect to a joint axial line and being adjacent to each other in the peripheral direction with their inclination directions opposite to each other, wherein the plurality of track grooves of the inner joint member are formed so as to be mirror-image symmetrical with the plurality of paired track grooves of the outer joint member with respect to a joint center plane at an operating angle of 0°, wherein the plurality of track grooves of the outer joint member and the plurality of track grooves of the inner joint member each have a length corresponding to a maximum operating angle required for a rear-wheel drive shaft, and wherein an axial clearance between the inner joint member and the cage is set larger than an axial clearance formed by a ball track clearance between each of the balls and each track groove.

Further, according to a second invention, which is devised to attain the above-mentioned object, there is provided a fixed type constant velocity universal joint, comprising: an outer joint member having a spherical inner peripheral surface in which a plurality of track grooves are formed so as to extend in an axial direction of the outer joint member; an inner joint member having a spherical outer peripheral surface in which a plurality of track grooves are formed so as to be paired with the plurality of track grooves of the outer joint member; a plurality of balls for transmitting torque, the plurality of balls being interposed between the plurality of track grooves of the outer joint member and the plurality of track grooves of the inner joint member; and a cage comprising pockets for receiving the balls, the cage having: a spherical outer peripheral surface fitted to the spherical inner peripheral surface of the outer joint member; and a spherical inner peripheral surface fitted to the spherical outer peripheral surface of the inner joint member, wherein the plurality of track grooves of the outer joint member are each formed into an arc shape having a curvature center that is prevented from being offset in the axial direction with respect to a joint center, the plurality of track grooves of the outer joint member being inclined in a peripheral direction of the outer joint member with respect to a joint axial line and being adjacent to each other in the peripheral direction with their inclination directions opposite to each other, wherein the plurality of track grooves of the inner joint member are formed so as to be mirror-image symmetrical with the plurality of paired track grooves of the outer joint member with respect to a joint center plane at an operating angle of 0°, wherein the plurality of track grooves of the outer joint member and the plurality of track grooves of the inner joint member each have a length corresponding to a maximum operating angle required for a propeller shaft, and wherein an axial clearance between the inner joint member and the cage is set larger than an axial clearance formed by a ball track clearance between each of the balls and each track groove.

Note that, the "joint axial line" in the first and second inventions refers to a longitudinal axial line that is a joint rotation center, and corresponds to a joint axial line N-N in the embodiments described later. Further, the "joint center plane at the operating angle of 0°" refers to a plane including the joint center at the operating angle of 0° and extending in a direction orthogonal to the joint axial line, and corresponds to a plane P in the embodiments described later. Further, the "ball track clearance" refers to a clearance formed between each of the balls and each of the track grooves in accordance with a PCD clearance that is obtained through subtraction of a PCD of the track grooves of the inner joint member from a PCD of the track grooves of the outer joint member (represented by ΔT in FIG. 9).

As described above, in the fixed type constant velocity universal joint according to the present invention, the track grooves of the outer joint member and the track grooves of the inner joint member each have the length corresponding to the maximum operating angle required for the rear-wheel drive shaft or the propeller shaft. That is, axial dimensions of the parts of the outer joint member, the inner joint member, and the cage, which directly influence the lengths of the track grooves, are decreased to be smaller than those in the fixed type constant velocity universal joint of Patent Literature 1. Thus, it is possible to attain a constant velocity universal joint that is lightweight, compact, and suited to the rear-wheel drive shaft or the propeller shaft. Further, the axial clearance between the inner joint member and the cage is set larger than the axial clearance formed by the ball track clearance between each of the balls and each track groove. With this, vibration with a small amplitude, such as idling vibration, can be effectively suppressed. Therefore, it is possible to attain a fixed type constant velocity universal joint capable of contributing to decrease of NVH factors of automobiles and the like.

Note that, the maximum operating angle required for the rear-wheel drive shaft may be set to 30°. Further, the maximum operating angle required for the propeller shaft may be set to 20°. In this case, the track grooves of the outer joint member and the track grooves of the inner joint member are each decreased to a length that is necessary and sufficient for the rear-wheel drive shaft or the propeller shaft. Thus, it is possible to attain a lightweight and compact fixed type constant velocity universal joint that is suited to application to the rear-wheel drive shaft or the propeller shaft.

It is preferred that the ball track clearance be set to take a positive value. With this, vibration with a small amplitude can efficiently be absorbed.

The curvature centers of the track grooves may be arranged on the joint axial line. With this, the depths of the track grooves can be set equal to each other, and processes thereon can be simplified. Further, the curvature centers of the track grooves may be arranged at positions offset in a radial direction with respect to the joint axial line. With this, track groove depths on an opening side and an interior side (opposite side to the opening) can be adjusted in accordance with the offset amount, and hence optimum track groove depth can be secured.

In the structure described above, the number of the balls to be used is not particularly limited, and may be set to, for example, any one of six, eight, ten, and twelve. The number of the balls may be set in accordance with the required characteristics. Specifically, when the number of the balls is set to six, there are such advantages in that the total number of components is smaller than that in the case where the number of the balls is set to eight, that satisfactory processability and assembly efficiency of the members can be achieved, and that a load capacity can be increased in accordance with increase in size of the balls. On the other hand, when the number of the balls is set to eight, there are such advantages in that further weight reduction and compactification, and less torque loss can be achieved as compared to the case where the number of the balls is set to six.

Advantageous Effects of Invention

As described above, according to the present invention, it is possible to attain the compact and lightweight fixed type constant velocity universal joint that is suppressed in torque loss and heat generation, enhanced in efficiency, capable of contributing to the decrease of NVH factors of automobiles, and suited to the rear-wheel drive shafts or the propeller shafts.

BRIEF DESCRIPTION OF DRAWINGS

FIG. 2A is a partial vertical sectional view of an outer joint member illustrated in FIG. 1A.

FIG. 2B is a front view of the outer joint member illustrated in FIG. 1A.

FIG. 13A is a partial vertical sectional view of a fixed type constant velocity universal joint according to a second embodiment of the present invention.

FIG. 13B is a front view of the fixed type constant velocity universal joint according to the second embodiment of the present invention.

FIG. 14A is a partial vertical sectional view of an outer joint member illustrated in FIG. 13A.

FIG. 14B is a front view of the outer joint member illustrated in FIG. 13A.

FIG. 21A is a partial vertical sectional view of a fixed type constant velocity universal joint according to a fifth embodiment of the present invention.

FIG. 21B is a front view of the fixed type constant velocity universal joint according to the fifth embodiment of the present invention.

DESCRIPTION OF EMBODIMENTS

Now, embodiments of the present invention are described with reference to the drawings.

Figure 1B:
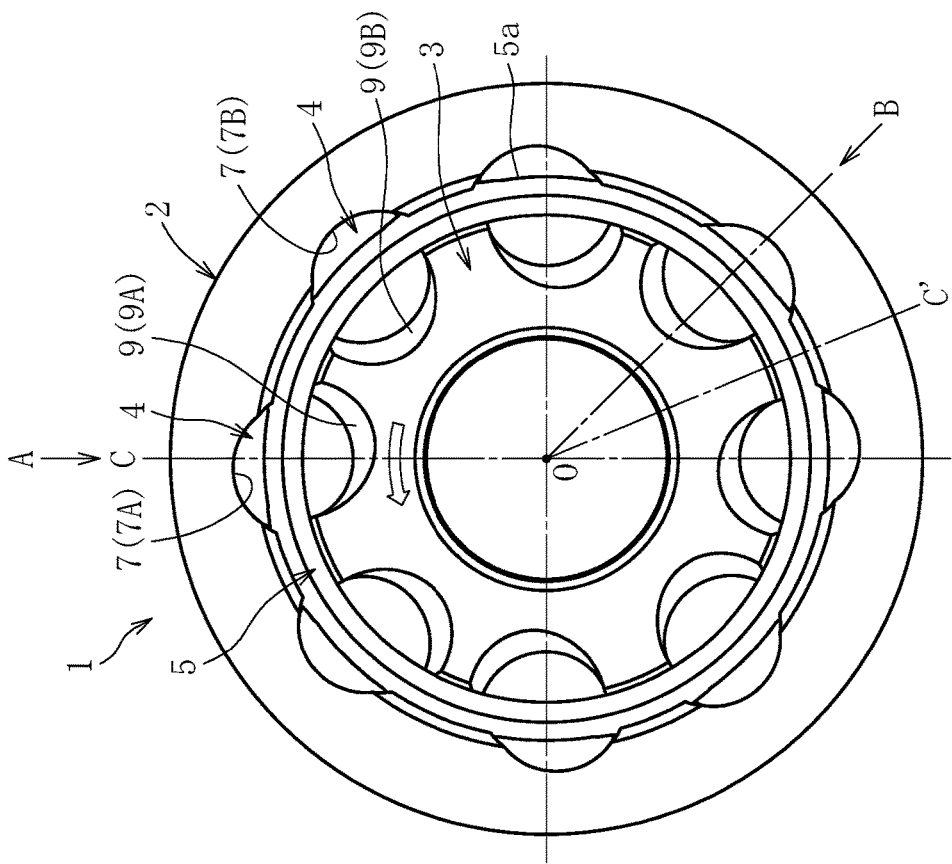
FIG. 1B is a front view of the fixed type constant velocity universal joint according to the first embodiment of the present invention.
Figure 1A:
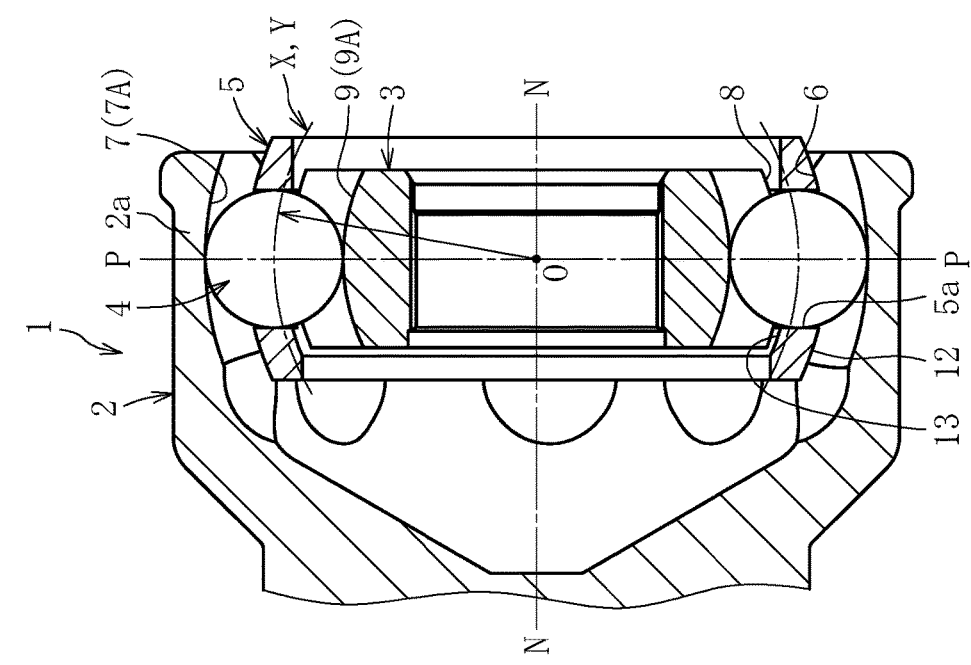
FIG. 1A is a partial vertical sectional view of a fixed type constant velocity universal joint according to a first embodiment of the present invention.

FIG. 1A is a partial vertical sectional view of a fixed type constant velocity universal joint 1 according to a first embodiment of the present invention, and FIG. 1B is a front view of the constant velocity universal joint 1 (right-hand side view of FIG. 1A). The constant velocity universal joint 1 is used in a state of being assembled to a rear-wheel drive shaft, and comprises an outer joint member 2, an inner joint member 3, balls 4, and a cage 5.

As illustrated also in FIG. 2A and FIG. 2B, eight track grooves 7 are formed in a spherical inner peripheral surface 6 of a mouth portion 2a of the outer joint member 2 so as to extend along an axial direction. The track grooves 7 comprise track grooves 7A and 7B that are inclined at an angle γ in a peripheral direction with respect to a joint axial line N-N and adjacent to each other in the peripheral direction with their inclination directions opposite to each other. As illustrated also in FIG. 3A and FIG. 3B, eight track grooves 9 are formed in a spherical outer peripheral surface 8 of the inner joint member 3 so as to extend along the axial direction. The track grooves 9 comprise track grooves 9A and 9B that are inclined at the angle γ in the peripheral direction with respect to the joint axial line N-N and adjacent to each other in the peripheral direction with their inclination directions opposite to each other. In addition, each ball 4 is arranged in a crossing portion between the paired track grooves 7 and 9 of the outer joint member 2 and the inner joint member 3. Note that, the track grooves 7 and 9 are illustrated in FIG. 1A under a state in which cross sections taken along a plane M illustrated in FIG. 2A and a plane Q illustrated in FIG. 3A are rotated to an inclination angle of γ=0°.

The term "ball raceway center line" is hereinafter used to accurately describe forms (such as inclined state and curved state) of the track grooves. The ball raceway center line refers to a trajectory of the center of the ball when the ball moves along the track groove. Thus, the form of the track grooves corresponds to a form of the ball raceway center lines.

As illustrated in FIG. 1A, a ball raceway center line X of each track groove 7 of the outer joint member 2 and a ball raceway center line Y of each track groove 9 of the inner joint member 3 are each formed into an arc shape having a curvature center at a joint center O. In this way, the curvature centers of the ball raceway center line X of each track groove 7 of the outer joint member 2 and the ball raceway center line Y of each track groove 9 of the inner joint member 3 are each arranged on the joint center O, that is, on the joint axial line N-N. With this, depths of the track grooves can be set equal to each other, and processes therefor can be simplified.

Although detailed illustration is omitted, the track grooves 7 and 9 are formed into an elliptical shape or a Gothic arch shape in horizontal cross section, and the track grooves 7 and 9 are held in so-called angular contact with each ball 4 at a contact angle of approximately from 30° to 45°. Thus, the ball 4 is held in contact with side surface portions of the track grooves 7 and 9, which are slightly spaced apart from groove bottoms of the track grooves 7 and 9.

Now, supplementary description is given of the reference symbols of the track grooves. Reference symbol 7 represents the track grooves of the outer joint member 2 as a whole. When the track grooves having different inclination directions are to be distinguished from each other, reference symbol 7A represents a track groove inclined on one side in the peripheral direction with respect to the joint axial line N-N, and reference symbol 7B represents a track groove inclined on the other side in the peripheral direction with respect to the joint axial line N-N. The track grooves 9 of the inner joint member 3 are represented by the reference symbols in a similar manner.

Referring to FIG. 2A and FIG. 2B, description is given of a state in which the track grooves 7 of the outer joint member 2 are inclined in the peripheral direction with respect to the joint axial line N-N. As illustrated in FIG. 2(a), a plane M including the ball raceway center line X of each track groove 7A and the joint center O is inclined at an angle γ on one side in the peripheral direction with respect to the joint axial line N-N. Further, a plane M (not shown) including the ball raceway center line X of each track groove 7B adjacent to the track groove 7A in the peripheral direction and the joint center O is inclined at an angle γ on the other side in the peripheral direction with respect to the joint axial line N-N (opposite direction to the inclination direction of the track groove 7A).

Figure 3B:
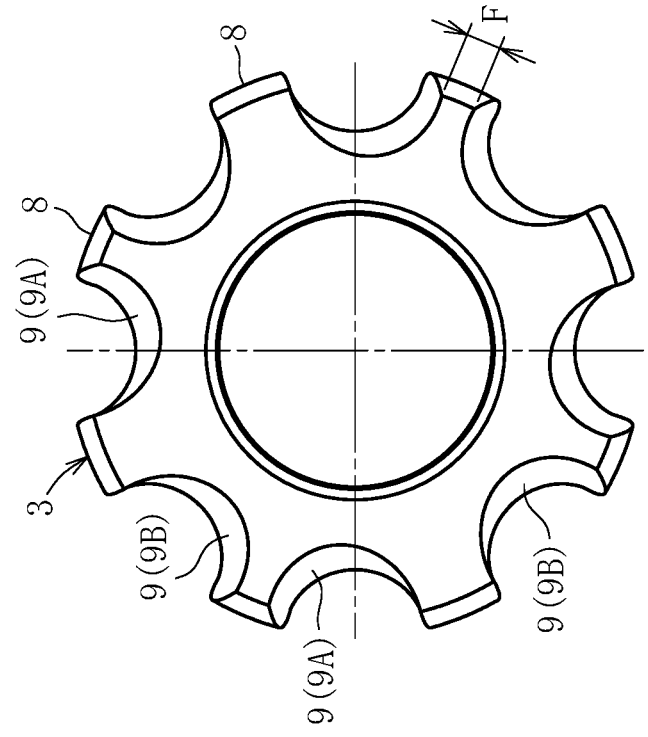
FIG. 3B is a front view of the inner joint member illustrated in FIG. 1A.
Figure 3A:
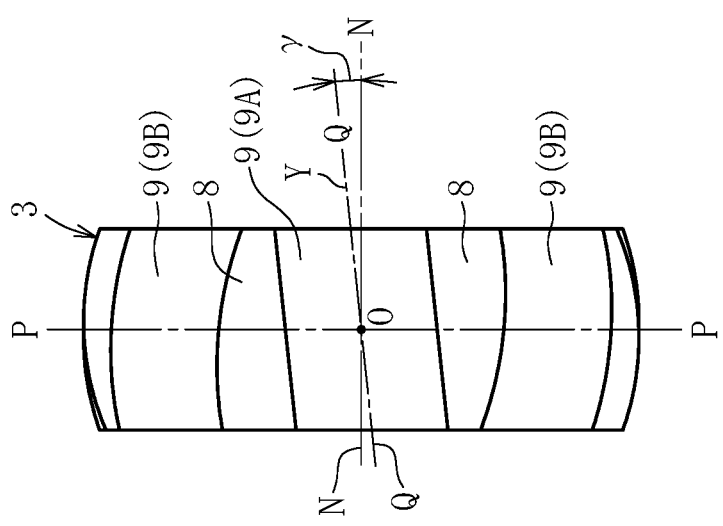
FIG. 3A is a side view of an inner joint member illustrated in FIG. 1A.

Referring to FIG. 3A and FIG. 3B, description is given of a state in which the track grooves 9 of the inner joint member 3 are inclined in the peripheral direction with respect to the joint axial line N-N. As illustrated in FIG. 3A, a plane Q including the ball raceway center line Y of each track groove 9A and the joint center O is inclined at an angle γ on one side in the peripheral direction with respect to the joint axial line N-N. Further, a plane Q (not shown) including the ball raceway center line Y of each track groove 9B adjacent to the track groove 9A in the peripheral direction and the joint center O is inclined at an angle γ on the other side in the peripheral direction with respect to the joint axial line N-N (opposite direction to the inclination direction of the track groove 9A). It is preferred that the above-mentioned angle (inclination angle) γ be set within a range of from 4° to 12° in consideration of operability of the constant velocity universal joint 1 and a spherical width F between the closest sides of the track grooves of the inner joint member 3. The track grooves 9 of the inner joint member 3 are formed so as to be mirror-image symmetrical with the paired track grooves 7 of the outer joint member 2 with respect to a joint center plane P at an operating angle of 0°.

Figure 4:
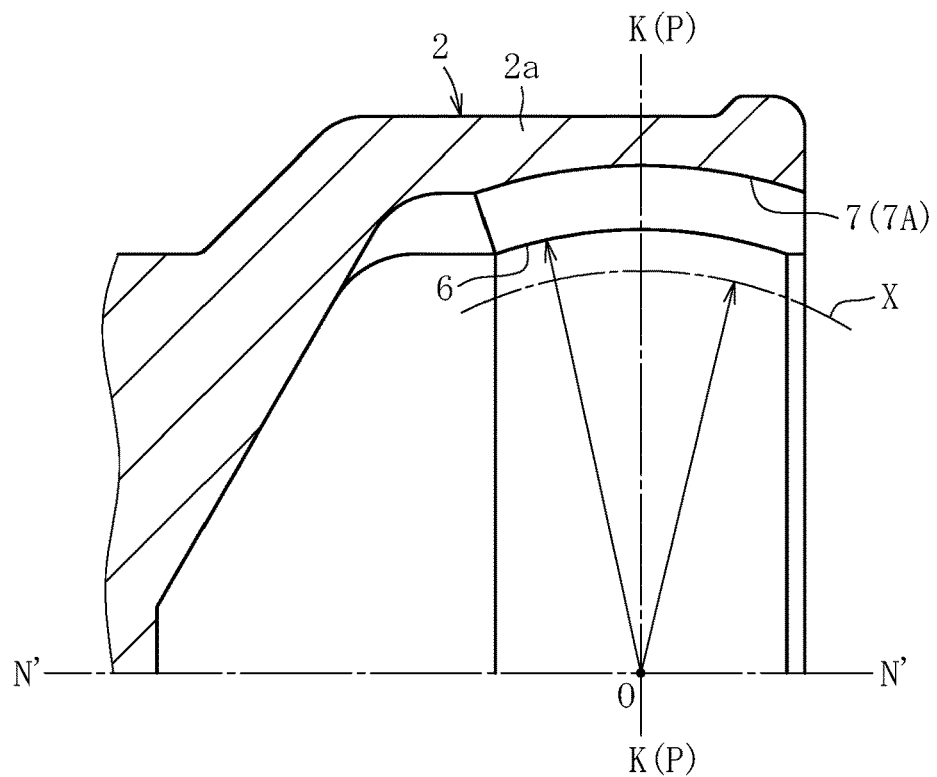
FIG. 4 is a partial vertical sectional view of details of a track groove of the outer joint member illustrated in FIG. 2A.

Next, referring to FIG. 4, detailed description is given of the track grooves of the outer joint member 2 when viewed in a vertical cross section. Note that, FIG. 4 is a sectional view taken along the plane M including the ball raceway center line X of the track groove 7A and the joint center O illustrated in FIG. 2A. That is, FIG. 4 is a sectional view in the plane including an inclined axis N'-N', which is inclined at the angle γ in the peripheral direction with respect to the joint axial line N-N. In FIG. 4, in the track grooves 7A and 7B having different inclination directions from each other, only the track groove 7A is illustrated. In the spherical inner peripheral surface 6 of the outer joint member 2, the track grooves 7A are formed along the axial direction. The track groove 7A has the arc-shaped ball raceway center line X having a curvature center at the joint center O (not offset in the axial direction). When assuming that K represents a perpendicular line at the joint center O, which is perpendicular to the inclined axis N'-N' projected onto the plane M (see FIG. 2A) including the ball raceway center line X of the track groove 7A and the joint center O, the perpendicular line K is located on the joint center plane P at the operating angle of 0°.

Figure 5:
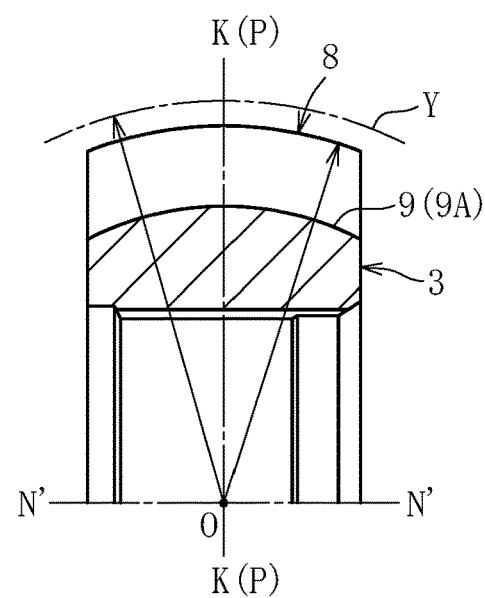
FIG. 5 is a vertical sectional view of details of a track groove of the inner joint member illustrated in FIG. 3A.

Similarly, referring to FIG. 5, detailed description is given of the track grooves of the inner joint member 3. FIG. 5 is a sectional view taken along the plane Q including the ball raceway center line Y of the track groove 9A and the joint center O illustrated in FIG. 3A. That is, FIG. 5 is an illustration of a cross section in the plane including the inclined axis N'-N', which is inclined at the angle γ in the peripheral direction with respect to the joint axial line N-N. In FIG. 5, in the track grooves 9A and 9B having different inclination directions from each other, only the track groove 9A is illustrated. In the spherical outer peripheral surface 8 of the inner joint member 3, the track grooves 9A are formed along the axial direction. The track groove 9A has the arc-shaped ball raceway center line Y having a curvature center at the joint center O (not offset in the axial direction). When assuming that K represents a perpendicular line at the joint center O, which is perpendicular to the inclined axis N'-N' projected onto the plane Q (see FIG. 3A) including the ball raceway center line Y of the track groove 9A and the joint center O, the perpendicular line K is located on the joint center plane P at the operating angle of 0°.

Figure 6A:
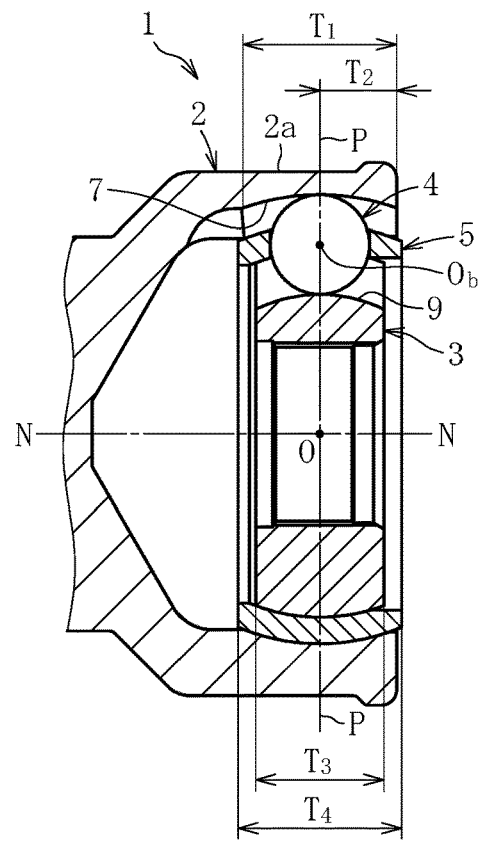
FIG. 6A is a sectional view taken along the line C-O-C' in FIG. 1B
Figure 6B:
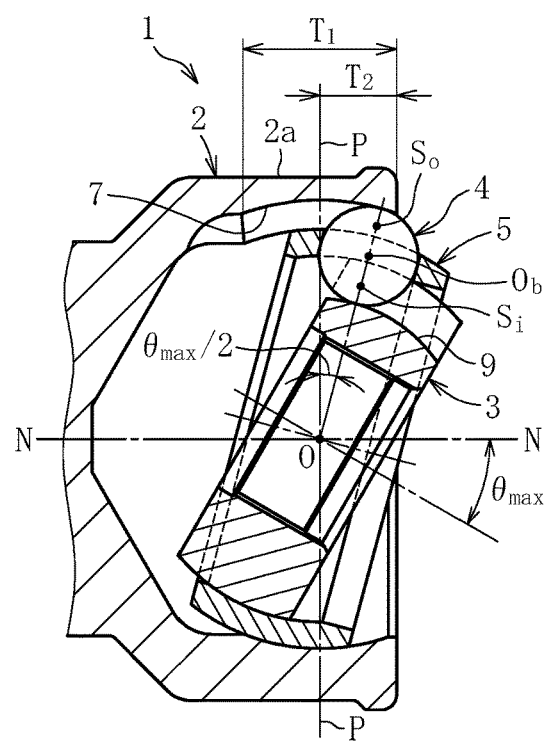
FIG. 6B is a schematic view of a state in which the constant velocity universal joint illustrated in FIG. 6A forms a maximum operating angle.

FIG. 6A and FIG. 6B are illustrations of a dimensional feature of the rear-wheel drive shaft-specific constant velocity universal joint 1 according to this embodiment. Note that, both of FIG. 6A and FIG. 6B are illustrations of a cross section taken along the joint axial line N-N. The track grooves 7 and 9 are illustrated in FIG. 6A and FIG. 6B under a state in which the cross sections taken along the plane M illustrated in FIG. 2A and the plane Q illustrated in FIG. 3A are rotated to the inclination angle of γ=0°.

As illustrated in FIG. 6B, when the constant velocity universal joint 1 forms a maximum operating angle θ max, a center Ob of the ball 4 moves to the position of θ max/2 with respect to the joint center plane P at the operating angle of 0°. Therefore, when the maximum operating angle θ max is set to 30°, the center Ob of the ball 4 moves by 15° with respect to the joint center plane P at the operating angle of 0°. Lengths of the track grooves 7 and 9 are set so that, in this state, the balls 4 are reliably held in contact with the track grooves 7 of the outer joint member 2 and the track grooves 9 of the inner joint member 3. Specifically, as in the illustration, the lengths of the track grooves are set so that allowance amounts are secured between contact points So and Si between the track grooves 7 and 9 and the ball 4, and end portions of the track grooves 7 and 9. In this case, the description specified in the scope of claims "the plurality of track grooves of the outer joint member and the plurality of track grooves of the inner joint member each have a length corresponding to a maximum operating angle required for a rear-wheel drive shaft" means that, as described above, "the track grooves have the lengths that are necessary and sufficient for reliably holding the balls in contact with the track grooves when the joint forms the maximum operating angle θ max."

Figure 22A:
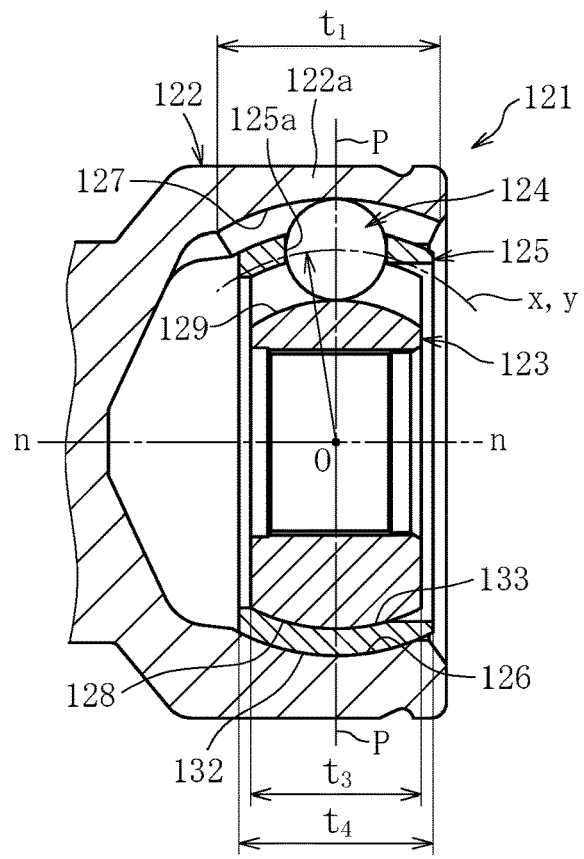
FIG. 22A is a partial vertical sectional view of a related-art fixed type constant velocity universal joint.
Figure 22B:
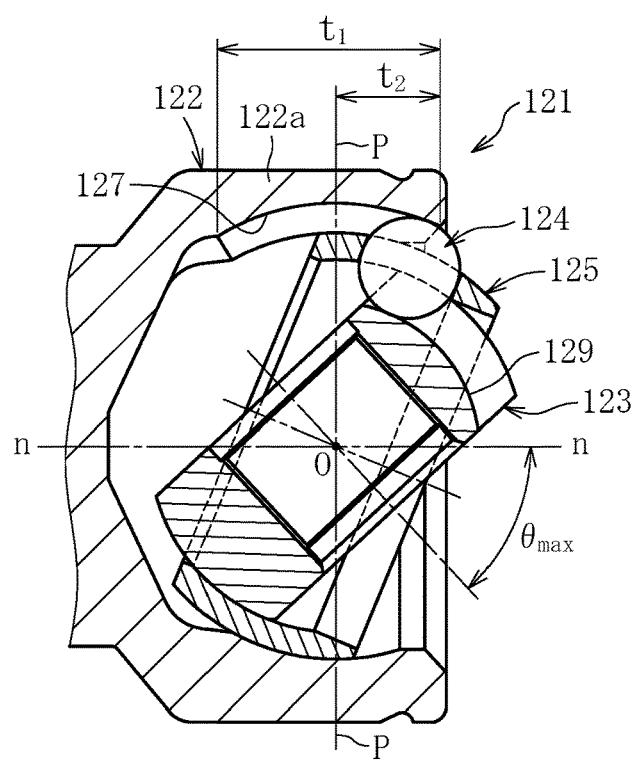
FIG. 22B is a schematic view of a state in which the related-art fixed type constant velocity universal joint forms a maximum operating angle.

Based on the lengths of the track grooves, for example, axial dimensions of the outer joint member 2 and the inner joint member 3 are determined. The maximum operating angle θ max of the fixed type constant velocity universal joint 1 is set to 30°. Thus, as illustrated in FIG. 6A, an axial dimension $T_1$ of the mouth portion 2a of the outer joint member 2, an axial dimension $T_2$ from the joint center O to an end portion of the outer joint member 2 on an opening side, an axial dimension $T_3$ of the inner joint member 3, and an axial dimension $T_4$ of the cage 5 are decreased to be sufficiently smaller than those in the fixed type constant velocity universal joint 121 illustrated in FIG. 22, in which the maximum operating angle θ max is set to 40°.

As described above, the axial dimensions $T_1$ and $T_2$ of the outer joint member 2 can be decreased, and hence a weight of the outer joint member 1 and a weight of a material thereof to be loaded can be decreased. Further, lengths of a finishing process on the track grooves 7 and the spherical inner peripheral surface 6 can be decreased. Similarly, the axial dimension $T_3$ of the inner joint member 3 can be decreased, and hence a weight of the inner joint member 3 and a weight of a material thereof to be loaded can be decreased. Further, lengths of a finishing process on the track grooves 9 and the spherical outer peripheral surface 8 can be decreased. In addition, in accordance with downsizing of an interior space of the joint, a use amount of a lubricant (such as grease) can be decreased. With this, the constant velocity universal joint 1 according to this embodiment is even more lightweight and compact than the fixed type constant velocity universal joint 121 illustrated in FIG. 22, which is designed for application to front-wheel drive shafts.

In the constant velocity universal joint 1 according to this embodiment, a configuration capable of absorbing vibration with a small amplitude is employed in addition to the configuration described above. Detailed description is given of the configuration with reference to FIG. 7 to FIG. 11.

Figure 7A:
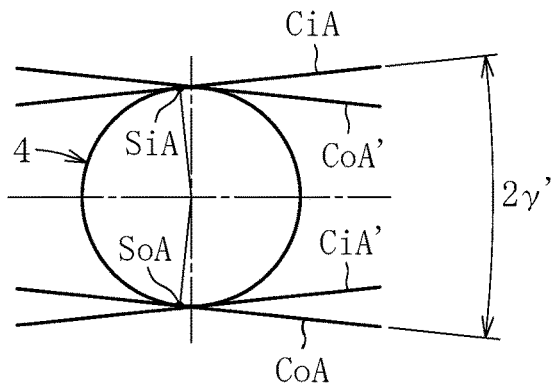
FIG. 7A is a schematic view of a held state of a ball when viewed in a direction of the arrow A in FIG. 1B.
Figure 7B:
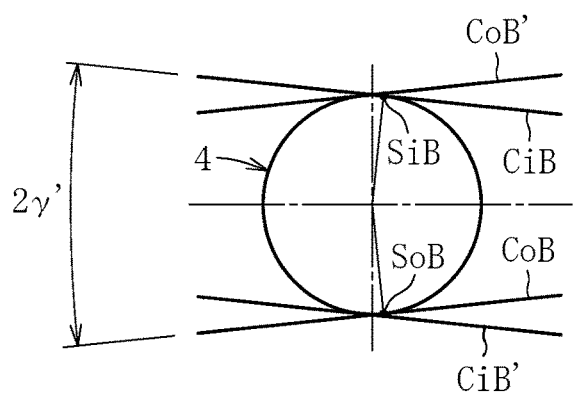
FIG. 7B is a schematic view of a held state of the ball when viewed in a direction of the arrow B in FIG. 1B.

FIG. 7A and FIG. 7B respectively are schematic views of held states of the ball 4 arranged between the track grooves 7 and 9 when viewed in a direction of the arrow A and a direction of the arrow B in FIG. 1B. In FIG. 7A, an actual wedge angle 2γ' between contact points SoA and SiA formed between the ball 4 and the track grooves 7A and 9A is illustrated. In FIG. 7B, an actual wedge angle 2γ' between contact points SoB and SiB formed between the ball 4 and the track grooves 7B and 9B is illustrated. In FIG. 7A and FIG. 7B, for the sake of convenience of description, the contact points SoA, SiA, SoB, and SiB are positioned in a plane of the drawing sheet.

Supplementary description is given of FIG. 7A. Reference symbols CoA and CoA' in FIG. 7A represent contact point trajectories between the track groove 7A of the outer joint member 2 and the ball 4, and reference symbols CiA and CiA' represent contact point trajectories between the track groove 9A of the inner joint member 3 and the ball 4. Under a state in which rotational torque in a direction indicated by the hollow arrow in FIG. 1B is applied to the inner joint member 3, the contact point trajectories CoA and CiA correspond to a load side, and the contact point trajectories CoA' and CiA' correspond to a non-load side. The contact point trajectories CoA and CiA on the load side form the wedge angle 2γ' in a manner of sandwiching the ball 4, and the contact point trajectories CoA' and CiA' on the non-load side form a wedge angle (not shown) that increases in an opposite direction to the direction in which the wedge angle $2\gamma'$ formed between the contact point trajectories CoA and CiA on the load side increases.

Further, supplementary description is given of FIG. 7B. Reference symbols CoB and CoB' in FIG. 7B represent contact point trajectories between the track groove 7B of the outer joint member 2 and the ball 4, and reference symbols CiB and CiB' represent contact point trajectories between the track groove 9B of the inner joint member 3 and the ball 4. Under a state in which rotational torque in a direction indicated by the hollow arrow in FIG. 1B is applied to the inner joint member 3, the contact point trajectories CoB and CiB correspond to the load side, and the contact point trajectories CoB' and CiB' correspond to the non-load side. The contact point trajectories CoB and CiB on the load side form the wedge angle $2\gamma'$ in a manner of sandwiching the ball 4, and the contact point trajectories CoB' and CiB' on the non-load side form a wedge angle (not shown) that increases in an opposite direction to the direction in which the wedge angle $2\gamma'$ formed between the contact point trajectories CoB and CiB on the load side increases.

Figure 8:
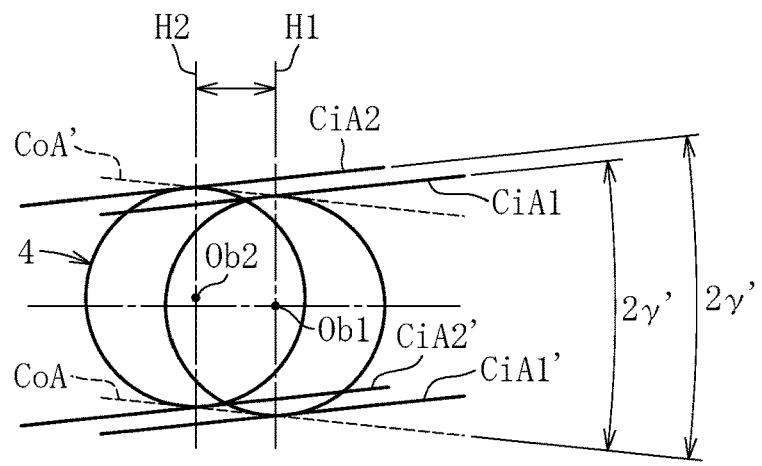
FIG. 8 is a schematic view of held states of the ball when both the joint members move relative to each other in an axial direction.

FIG. 8 is a view for illustrating the held state of the ball 4 illustrated in FIG. 7A (state before displacement), and the held state of the ball 4 when the inner joint member 3 is moved relative to the outer joint member 2 in the axial direction (state after the displacement) in a superimposed manner. Similarly to FIG. 7, the contact points between the ball 4 and the track grooves are positioned in the plane of the drawing sheet. Reference symbols H1 and H2 in FIG. 8 respectively represent an axial position of a center Ob1 of the ball 4 before the displacement, and an axial position of a center Ob2 of the ball 4 after the displacement. Further, reference symbols CiA1 and CiA1' in FIG. 8 represent contact point trajectories between the track groove 9A of the inner joint member 3 and the ball 4 under the state before the displacement, and reference symbols CiA2 and CiA2' represent contact point trajectories between the track groove 9A of the inner joint member 3 and the ball 4 under the state after the displacement.

In the constant velocity universal joint 1 according to this embodiment, curvature centers of the arc-shaped track grooves 7 (7A and 7B) and 9 (9A and 9B) are arranged at the joint center O (track grooves 7 and 9 are not offset in the axial direction). Accordingly, the wedge angle $2\gamma'$ is determined based on the inclination angles $\gamma$ of the track grooves 7 and 9, that is, the inclination angles $\gamma$ of the ball raceway center lines X and Y. Thus, as illustrated in FIG. 8, even when the axial position of the ball 4 varies along with the relative movement between the outer joint member 2 and the inner joint member 3 in the axial direction, crossing angles between the track grooves 7A and 9A remain unchanged. That is, the wedge angle $2\gamma'$ formed between the contact point trajectory CoA between the track groove 7A of the outer joint member 2 and the ball 4, and the contact point trajectories CiA (CiA1 and CiA2) between the track groove 9 of the inner joint member 3 and the ball 4 remain unchanged as well. The same applies to the contact point trajectories CoB and CiB of the track grooves 7B and 9B. Thus, the forces of the ball 4 to the cage 5, which are generated at the wedge angle $2\gamma'$ between the contact point trajectories CoA and CiA and the wedge angle $2\gamma'$ between the contact point trajectories CoB and CiB, are balanced with each other.

Next, description is given of spherical clearances between the cage 5 and both the joint members 2 and 3, and ball track clearances between the ball 4 and the track grooves 7 and 9. In general, an amount of the axial displacement between both the joint members 2 and 3 in the fixed type constant velocity universal joint is relevant to the clearances of the above-mentioned types (clearance widths thereof). In the constant velocity universal joint 1 according to this embodiment, based on the above-mentioned feature that the wedge angle $2\gamma'$ remains unchanged even when the axial position of the ball 4 varies, the clearances of the above-mentioned types are set so as to achieve smooth operation by absorbing a larger amount of vibration with a small amplitude. Now, referring to FIG. 9 to FIG. 11, description is given of a relationship between ball track clearances $\Delta T$ between the ball 4 and the track grooves 7 and 9, and the spherical clearances between the cage 5 and both the joint members 2 and 3.

Figure 9:
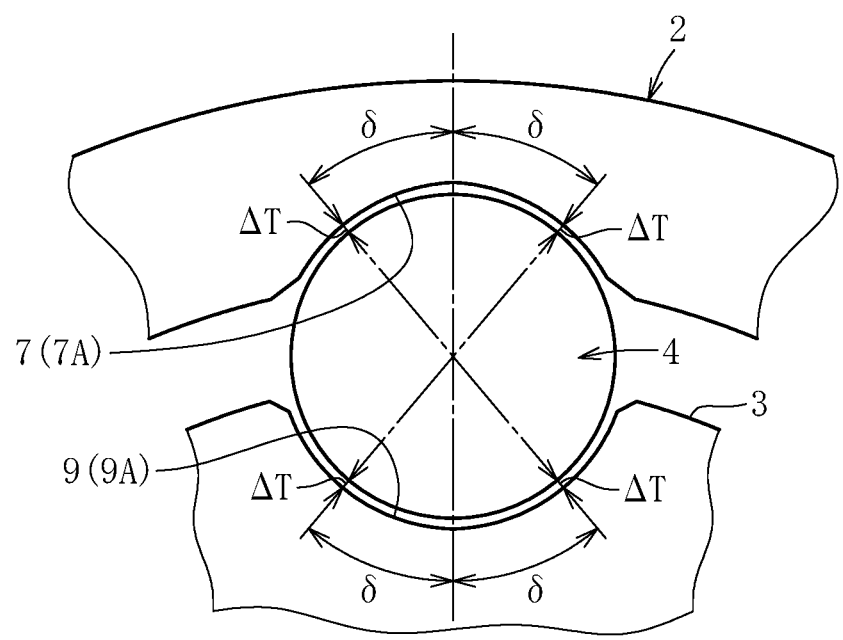
FIG. 9 is a partial sectional view for illustrating ball track clearances.
Figure 10:
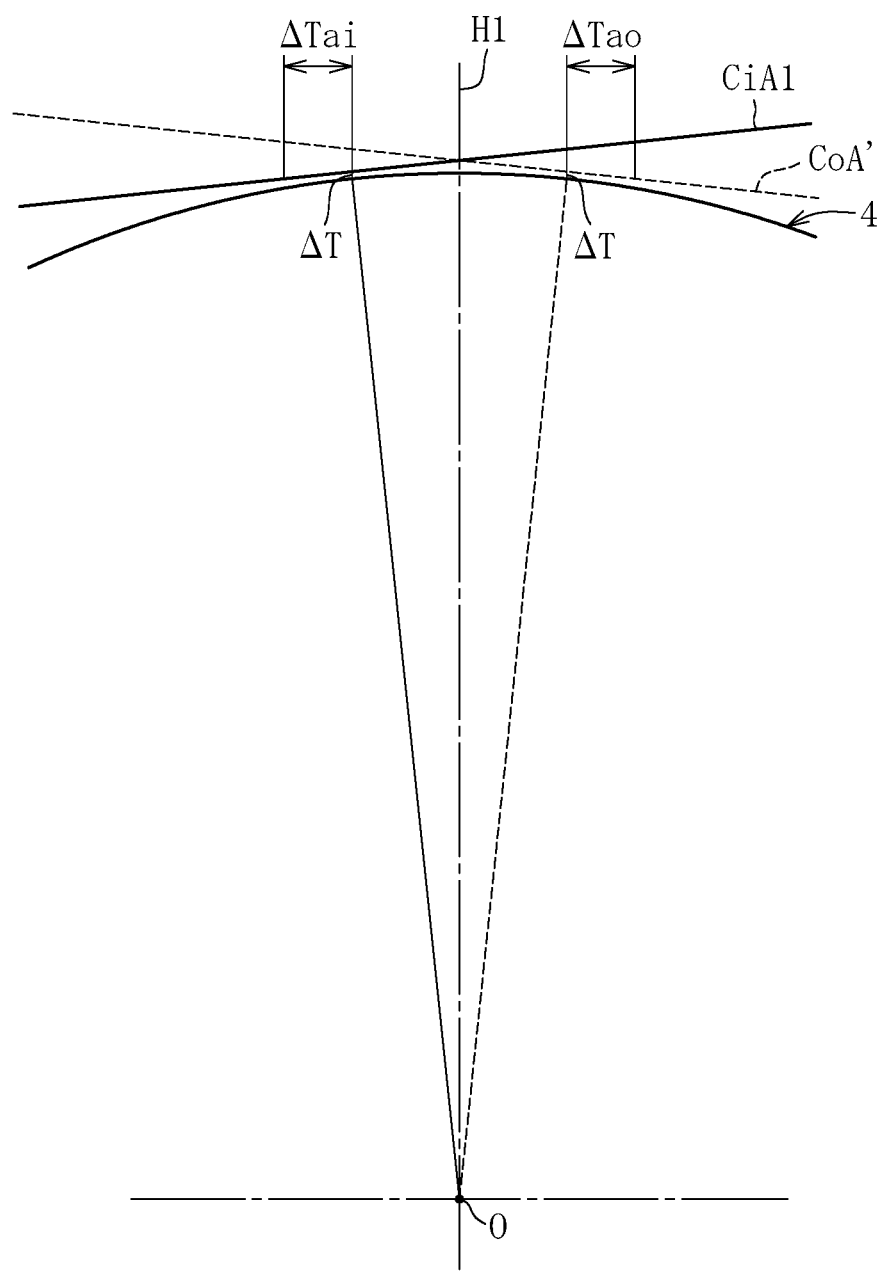
FIG. 10 is a schematic view for illustrating axial clearances formed by the ball track clearances.

First, description is given of the ball track clearances $\Delta T$ between the ball 4 and the track grooves 7 and 9 with reference to FIG. 9 and FIG. 10. FIG. 9 is a partial horizontal sectional view taken along the joint center plane P of the constant velocity universal joint 1 illustrated in FIG. 1A. The track grooves 7 (7A) and 9 (9A) illustrated in the cross section in FIG. 9 are perpendicular to the ball raceway center lines X and Y of the track grooves 7 (7A) and 9 (9A).

At the time of torque transmission, the ball 4 and each of the track grooves 7 (7A) and 9 (9A) of both the joint members 2 and 3 are held in angular contact at contact angles $\delta$ illustrated in FIG. 9, and the ball track clearances $\Delta T$ each taking a positive value are formed in the directions of the contact angles $\delta$ under a state in which both the joint members 2 and 3 are located at neutral positions in the peripheral direction (non-load state). Note that, in FIG. 9, for the sake of better understanding, the ball track clearances $\Delta T$ are illustrated on an exaggerated scale.

FIG. 10 is a partial enlarged view of FIG. 8, specifically, FIG. 10 is an illustration of a state in which the axial position H1 before the displacement, which is illustrated in FIG. 8, is matched with the joint center OP under the state in which both the joint members 2 and 3 are located at the neutral positions in the peripheral direction (non-load state). As described with reference to FIG. 9, the ball track clearances $\Delta T$ are formed between the ball 4 and the track grooves 7 (7A) and 9 (9A). Thus, an axial clearance $\Delta Tao$ is formed between the ball 4 and the contact point trajectory CoA' of the track groove 7 (7A) of the outer joint member 2, and an axial clearance $\Delta Tai$ is formed between the ball 4 and the contact point trajectory CiA1 of the track groove 9 (9A) of the inner joint member 3. Although illustration is omitted, similarly, the axial clearance $\Delta Tao$ is formed between the ball 4 and the contact point trajectory CoA of the track groove 7 (7A) of the outer joint member 2, and the axial clearance $\Delta Tai$ is formed between the ball 4 and the contact point trajectory CiA1' of the track groove 9 (9A) of the inner joint member 3.

Figure 11:
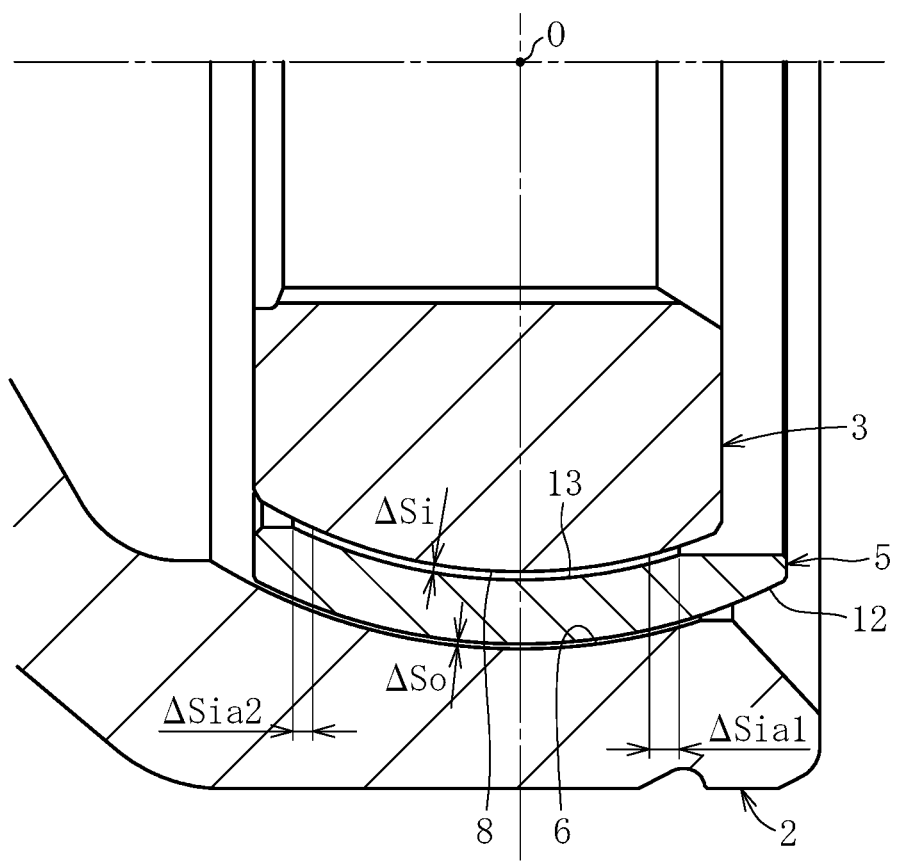
FIG. 11 is a partial vertical sectional view for illustrating a spherical clearance.

Next, referring to FIG. 11, description is given of the spherical clearances formed between the cage 5 and both the joint members 2 and 3. FIG. 11 is a partial sectional view of the constant velocity universal joint 1 under the non-load state (sectional view taken along the line O-C' in FIG. 1B). As illustrated in FIG. 11, a spherical clearance $\Delta So$ is formed between the spherical inner peripheral surface 6 of the outer joint member 2 and a spherical outer peripheral surface 12 of the cage 5, and a spherical clearance $\Delta Si$ is formed between the spherical outer peripheral surface 8 of the inner joint member 3 and a spherical inner peripheral surface 13 of the cage 5. The spherical clearance $\Delta Si$ comprises axial clearances $\Delta Sia1$ and $\Delta Sia2$ that are formed between the inner joint member 3 and the cage 5 and cause the inner joint member 3 and the cage 5 to be spaced apart from each other in the axial direction respectively on the opening side and an interior side (opposite side to the opening) of the outer joint member 2.

The constant velocity universal joint 1 according to this embodiment is configured so that the following relational expressions are established between the axial clearances ΔSia1 and ΔSia2 between the inner joint member 3 and the cage 5, and the axial clearances ΔTao and ΔTai formed by the above-mentioned ball track clearances ΔT.

$$\Delta Sia1 > (\Delta Tao + \Delta Tai)$$

$$\Delta Sia2 > (\Delta Tao + \Delta Tai)$$

In this case, the description specified in the scope of claims of the present application "an axial clearance between the inner joint member and the cage is set larger than an axial clearance formed by a ball track clearance between each of the balls and each track groove" means that the above-mentioned relational expressions are established.

In addition, as described above, the ball track clearances ΔT between the ball 4 and the track grooves 7 and 9 are each set to take a positive value. Thus, even when idling vibration (axial small vibration) is transmitted to the inner joint member 3 of the fixed type constant velocity universal joint 1 via a differential gear, a plunging type constant velocity universal joint, and an intermediate shaft (not shown), the balls 4 can be caused to smoothly roll along the track grooves 7 and 9, that is, the outer joint member 2 and the inner joint member 3 can smoothly be displaced relative to each other in the axial direction. Also at the time of the relative displacement described above, the axial clearances between the spherical surfaces can be secured because, as described above, the axial clearances ΔSia1 and ΔSia2 between the inner joint member 3 and the cage 5 are each set larger than the axial clearances (ΔTao+ΔTai) formed by the ball track clearances ΔT. In addition, the forces of the ball 4 to the cage 5, which are generated at the wedge angle 2γ' formed between the contact point trajectories CoA and CiA and the wedge angle 2γ' formed between the contact point trajectories CoB and CiB, are balanced with each other. With this, the axial clearances between the spherical surfaces can be maintained without causing the cage 5 to be biased in the axial direction. Those mutual effects enable both the joint members 2 and 3 to be displaced relative to each other in the axial direction without causing contact (spherical contact) between the spherical outer peripheral surface 8 of the inner joint member 3 and the spherical inner peripheral surface 13 of the cage 5. With this, axial vibration with a small amplitude, such as idling vibration, can smoothly be absorbed.

The above-mentioned configuration capable of absorbing vibration with a small amplitude is employed also in fixed type constant velocity universal joints according to other embodiments described later. However, in the other embodiments described later, detailed description thereof is omitted for the sake of simplicity of description.

Note that, the axial clearances ΔSia1 and ΔSia2 between the inner joint member 3 and the cage 5, and the axial clearances ΔTao and ΔTai formed by the ball track clearances ΔT between the ball 4 and the track grooves 7 and 9 are set so as to satisfy the above-mentioned relational expressions. Thus, it is only necessary that the spherical clearance ΔSo between the spherical inner peripheral surface 6 of the outer joint member 2 and the spherical outer peripheral surface 12 of the cage 5 have such a minimum value that flexing movement (angular displacement) of both the joint members 2 and 3 is not disturbed.

Further, as described above, in the fixed type constant velocity universal joint of a track groove crossing type, the wedge angle 2γ' formed between the contact point trajectories CoA and CiA between the ball 4 and the track grooves 7A and 9A, and the wedge angle 2γ' formed between the contact point trajectories CoB and CiB between the ball 4 and the track grooves 7B and 9B each remain unchanged. Thus, the forces applied from the ball 4 to the cage 5 are balanced with each other. Accordingly, there occurs no contact (spherical contact) between the spherical inner peripheral surface 6 of the outer joint member 2 and the spherical outer peripheral surface 12 of the cage 5, or no contact (spherical contact) between the spherical outer peripheral surface 8 of the inner joint member 3 and the spherical inner peripheral surface 13 of the cage 5. Heat generation to be caused by the spherical contact is effectively suppressed or prevented, and hence torque transmission efficiency and durability can be enhanced.

Figure 12:
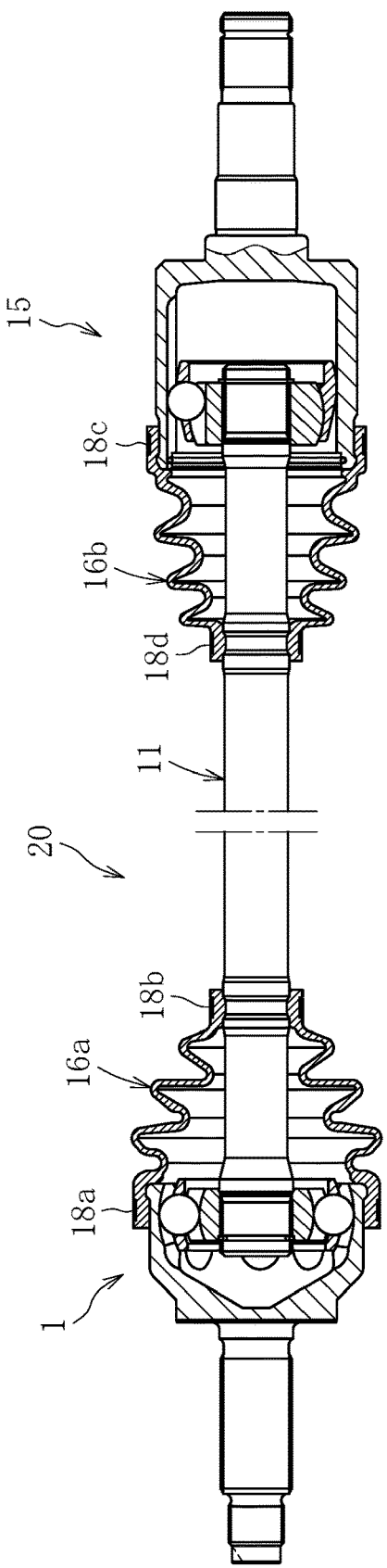
FIG. 12 is a schematic sectional view of a rear-wheel drive shaft comprising the fixed type constant velocity universal joint illustrated in FIG. 1A.

FIG. 12 is an illustration of an automotive rear-wheel drive shaft 20, to which the fixed type constant velocity universal joint 1 described above is assembled. The fixed type constant velocity universal joint 1 is coupled to one end of an intermediate shaft 11, and a plunging type constant velocity universal joint 15 is coupled to the other end of the intermediate shaft 11. At a portion between an outer peripheral surface of the fixed type constant velocity universal joint 1 and an outer peripheral surface of the intermediate shaft 11, and at a portion between an outer peripheral surface of the plunging type constant velocity universal joint 15 and the outer peripheral surface of the intermediate shaft 11, bellows boots 16a and 16b are respectively fixed by being fastened with boot bands 18 (18a, 18b, 18c, and 18d). Grease is sealed inside the joint as a lubricant. Through use of the fixed type constant velocity universal joint 1 according to this embodiment, it is possible to attain a rear-wheel drive shaft 20 that is suppressed in torque loss and heat generation, enhanced in efficiency, capable of effectively absorbing vibration with a small amplitude, and is lightweight and compact. An automobile having the drive shaft 20 mounted therein is improved in torque transmission efficiency, and hence can be suppressed in fuel consumption. In addition, factors of noise, vibration, and harshness (NVH) are decreased.

FIG. 13A is a partial vertical sectional view of a fixed type constant velocity universal joint 21 according to a second embodiment of the present invention, and FIG. 13B is a front view of the fixed type constant velocity universal joint 21 (right-hand side view of FIG. 13A). The constant velocity universal joint 21 according to this embodiment is used in a state of being assembled into a propeller shaft (detailed description is given later), and is common to the fixed type constant velocity universal joint 1 illustrated in FIG. 1 and the like in that the constant velocity universal joint 21 comprises an outer joint member 22, an inner joint member 23, balls 24, and a cage 25, but is different from the fixed type constant velocity universal joint 1 illustrated in FIG. 1 and the like in that the outer joint member 22 formed into a disc shape (ring shape) is used.

As illustrated in FIG. 13A, the ball raceway center line X of each track groove 27 of the outer joint member 22 and the ball raceway center line Y of each track groove 29 of the inner joint member 23 are each formed into an arc shape having a curvature center at the joint center O. In this way, the curvature centers of the ball raceway center line X of each track groove 27 of the outer joint member 22 and the ball raceway center line Y of each track groove 29 of the inner joint member 23 are each arranged on the joint center O, that is, on the joint axial line N-N. With this, depths of the track grooves can be set equal to each other, and processes thereon can be simplified.

Although detailed illustration is omitted, the track grooves 27 and 29 are formed, for example, into an elliptical shape or a Gothic arch shape in horizontal cross section (cross section orthogonal to the axis), and the track grooves 27 and 29 are held in so-called angular contact with each ball 24 at the contact angle of approximately from 30° to 45°. Thus, the ball 24 is held in contact with side surface portions of the track grooves 27 and 29, which are slightly spaced apart from groove bottoms of the track grooves 27 and 29.

Referring to the partial vertical cross section of the outer joint member 22 illustrated in FIG. 14A, and the front view of the outer joint member 22 illustrated in FIG. 14B (right-hand side surface of FIG. 14A), description is given of a state in which the track grooves 27 of the outer joint member 22 are inclined in the peripheral direction with respect to the joint axial line N-N. As illustrated in FIG. 14A, the plane M including the ball raceway center line X of each track groove 27A and the joint center O is inclined at the angle γ on one side in the peripheral direction with respect to the joint axial line N-N. Further, the plane M (not shown) including the ball raceway center line X of each track groove 27B adjacent to the track groove 27A in the peripheral direction and the joint center O is inclined at the angle γ on the other side in the peripheral direction with respect to the joint axial line N-N (opposite direction to the inclination direction of the track groove 27A).

Figure 15B:
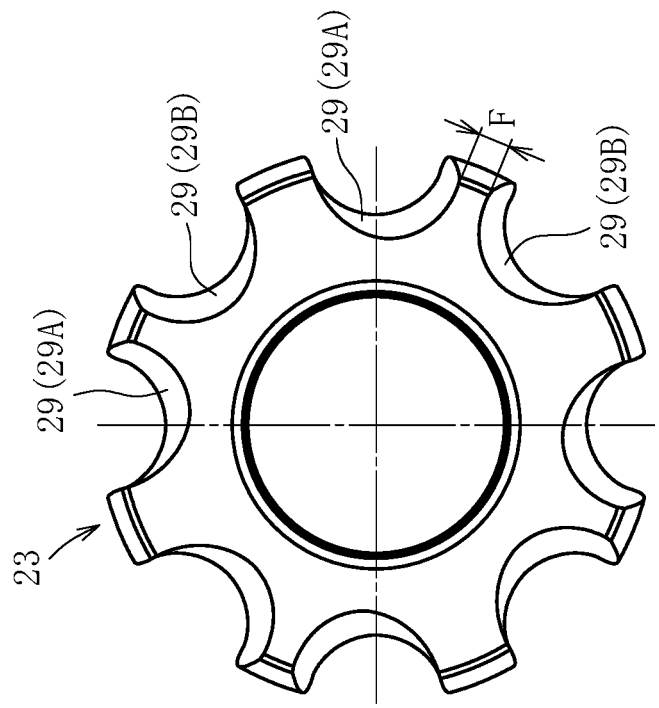
FIG. 15B is a front view of the inner joint member illustrated in FIG. 13A.
Figure 15A:
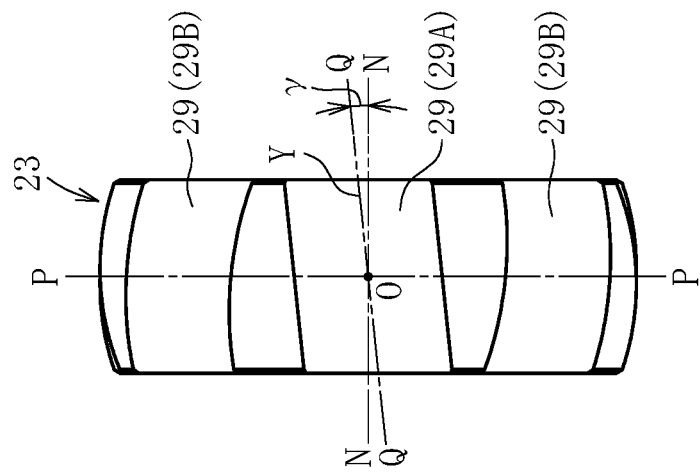
FIG. 15A is a side view of an inner joint member illustrated in FIG. 13A.

Referring to the side view of the inner joint member 23 illustrated in FIG. 15A, and the front view of the inner joint member 23 illustrated in FIG. 15B, description is given of a state in which the track grooves 29 of the inner joint member 23 are inclined in the peripheral direction with respect to the joint axial line N-N. As illustrated in FIG. 15A, the plane Q including the ball raceway center line Y of each track groove 29A and the joint center O is inclined at the angle γ on one side in the peripheral direction with respect to the joint axial line N-N. Further, the plane Q (not shown) including the ball raceway center line Y of each track groove 29B adjacent to the track groove 29A in the peripheral direction and the joint center O is inclined at the angle γ on the other side in the peripheral direction with respect to the joint axial line N-N (opposite direction to the inclination direction of the track groove 29A). It is preferred that the above-mentioned angle (inclination angle) γ be set within the range of from 4° to 12° in consideration of operability of the constant velocity universal joint 21 and the spherical width F between the closest sides of the track grooves of the inner joint member 23. The track grooves 29 of the inner joint member 23 are formed so as to be mirror-image symmetrical with the paired track grooves 27 of the outer joint member 22 with respect to the joint center plane P at the operating angle of 0°.

Figure 16:
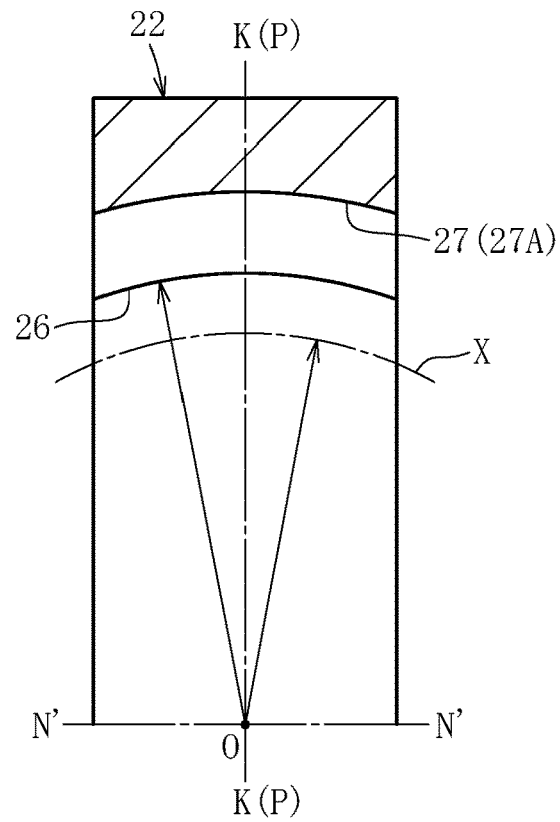
FIG. 16 is a partial vertical sectional view of details of a track groove of the outer joint member illustrated in FIG. 14A.

Next, referring to FIG. 16, detailed description is given of the track grooves in a vertical cross section of the outer joint member 22. Note that, FIG. 16 is a sectional view taken along the plane M illustrated in FIG. 14A including the ball raceway center line X of the track groove 27A and the joint center O. That is, FIG. 16 is a sectional view in the plane including the inclined axis N'-N', which is inclined at the angle γ in the peripheral direction with respect to the joint axial line N-N. In FIG. 16, in the track grooves 27A and 27B having inclination directions different from each other, only the track groove 27A is illustrated. In a spherical inner peripheral surface 26 of the outer joint member 22, the track grooves 27A are formed along the axial direction. The track groove 27A has the arc-shaped ball raceway center line X having a curvature center at the joint center O. When assuming that K represents a perpendicular line at the joint center O, which is perpendicular to the inclined axis N'-N' projected onto the plane M (see FIG. 14A) including the ball raceway center line X of the track groove 27A and the joint center O, the perpendicular line K is formed in the joint center plane P at the operating angle of 0°.

Figure 17:
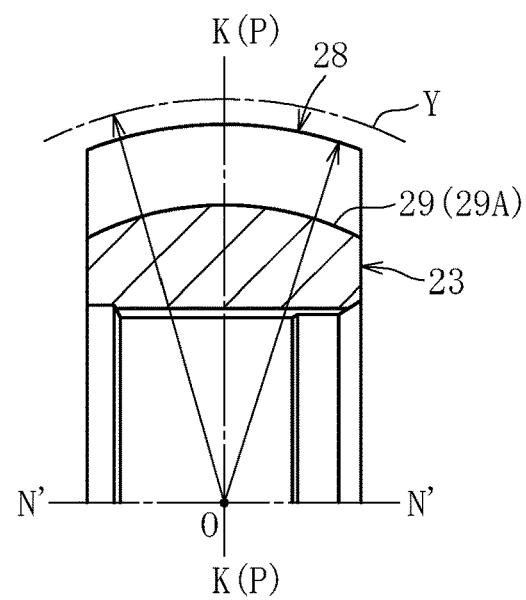
FIG. 17 is a vertical sectional view of details of a track groove of the inner joint member illustrated in FIG. 15A.

Similarly, referring to FIG. 17, detailed description is given of the track grooves of the inner joint member 3. FIG. 17 is a sectional view taken along the plane Q illustrated in FIG. 15A including the ball raceway center line Y of the track groove 29A and the joint center O. That is, FIG. 17 is an illustration of a cross section in the plane including the inclined axis N'-N', which is inclined at the angle γ in the peripheral direction with respect to the joint axial line N-N. In FIG. 17, in the track grooves 29A and 29B having inclination directions different from each other, only the track groove 29A is illustrated. In a spherical outer peripheral surface 28 of the inner joint member 23, the track grooves 29A are formed along the axial direction. The track groove 29A has the arc-shaped ball raceway center line Y having a curvature center at the joint center O. When assuming that K represents a perpendicular line at the joint center O, which is perpendicular to the inclined axis N'-N' projected onto the plane Q (see FIG. 15A) including the ball raceway center line Y of the track groove 29A and the joint center O, the perpendicular line K is formed in the joint center plane P at the operating angle of 0°.

Figure 18:
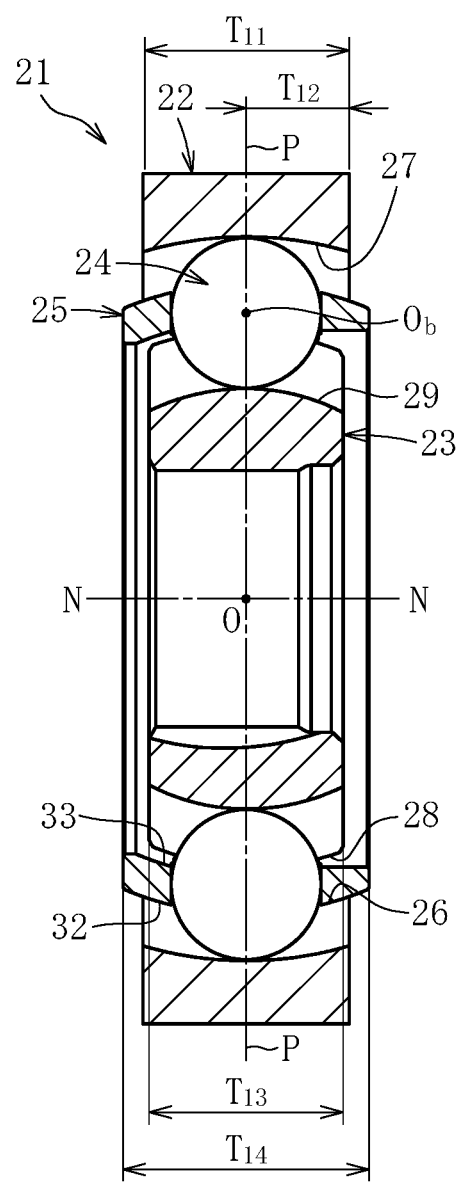
FIG. 18 is a view for illustrating dimensions of parts of the fixed type constant velocity universal joint illustrated in FIG. 13A.

In FIG. 18, a dimensional feature of the propeller shaft-specific constant velocity universal joint 21 according to this embodiment is illustrated. Note that, FIG. 18 is an illustration of a cross section taken along the joint axial line N-N. The track grooves are illustrated in FIG. 18 under a state in which the cross sections taken along the plane M illustrated in FIG. 14A and the plane Q illustrated in FIG. 15A are rotated to the inclination angle of γ=0°. Although illustration is omitted, when the constant velocity universal joint 21 forms the maximum operating angle θ max (20° in this case), the center Ob of the ball 24 moves to the position of θ max/2 with respect to the joint center plane P at the operating angle of 0°. Thus, when the maximum operating angle θ max is set to 20° as in this embodiment, the center Ob of the ball 24 moves by 10° with respect to the joint center plane P at the operating angle of 0°. Lengths of the track grooves 27 and 29 are set so that, in this state, the balls 24 are reliably held in contact with the track grooves 27 of the outer joint member 22 and the track grooves 29 of the inner joint member 23. Specifically, the lengths of the track grooves are set so that allowance amounts are secured between contact points between the track grooves 27 and 29 and the ball 24, and end portions of the track grooves 27 and 29. The description in the scope of claims "the plurality of track grooves of the outer joint member and the plurality of track grooves of the inner joint member each have a length corresponding to a maximum operating angle required for a propeller shaft" means that, as described above, "the track grooves have the lengths that are necessary and sufficient for reliably holding the balls in contact with the track grooves when the joint forms the maximum operating angle θ max."

Based on the lengths of the track grooves, for example, axial dimensions of the outer joint member 22 and the inner joint member 23 are determined. The maximum operating angle θ max of the fixed type constant velocity universal joint 21 is set to 20°. Thus, as illustrated in FIG. 18, an axial dimension $T_{11}$ of the outer joint member 22, an axial dimension $T_{12}$ from the joint center O to the end portion of the outer joint member 22 on the opening side, an axial dimension $T_{13}$ of the inner joint member 23, and an axial dimension $T_{14}$ of the cage 25 are decreased to be sufficiently smaller than those in the related-art fixed type constant velocity universal joint 121 illustrated in FIG. 22, in which the maximum operating angle θ max is set to 40°.

As described above, the axial dimensions $T_{11}$ and $T_{12}$ of the outer joint member 22 can be decreased, and hence a weight of the outer joint member 22 as a finished product and a weight of a material thereof to be loaded can be decreased. Further, lengths of a finishing process on the track grooves 27 and the spherical inner peripheral surface 26 can be decreased. Similarly, the axial dimension $T_{13}$ of the inner joint member 23 can be decreased, and hence a weight of the inner joint member 23 as a finished product and a weight of a material thereof to be loaded can be decreased. Further, lengths of a finishing process on the track grooves 29 and the spherical outer peripheral surface 28 can be decreased. In addition, in accordance with downsizing of an interior space of the joint, a use amount of the lubricant (such as grease) can be decreased. With this, the constant velocity universal joint 21 according to this embodiment is even more lightweight and compact than the related-art fixed type constant velocity universal joint 121 illustrated in FIG. 22, which is designed for application to front-wheel drive shafts.

Figure 19:
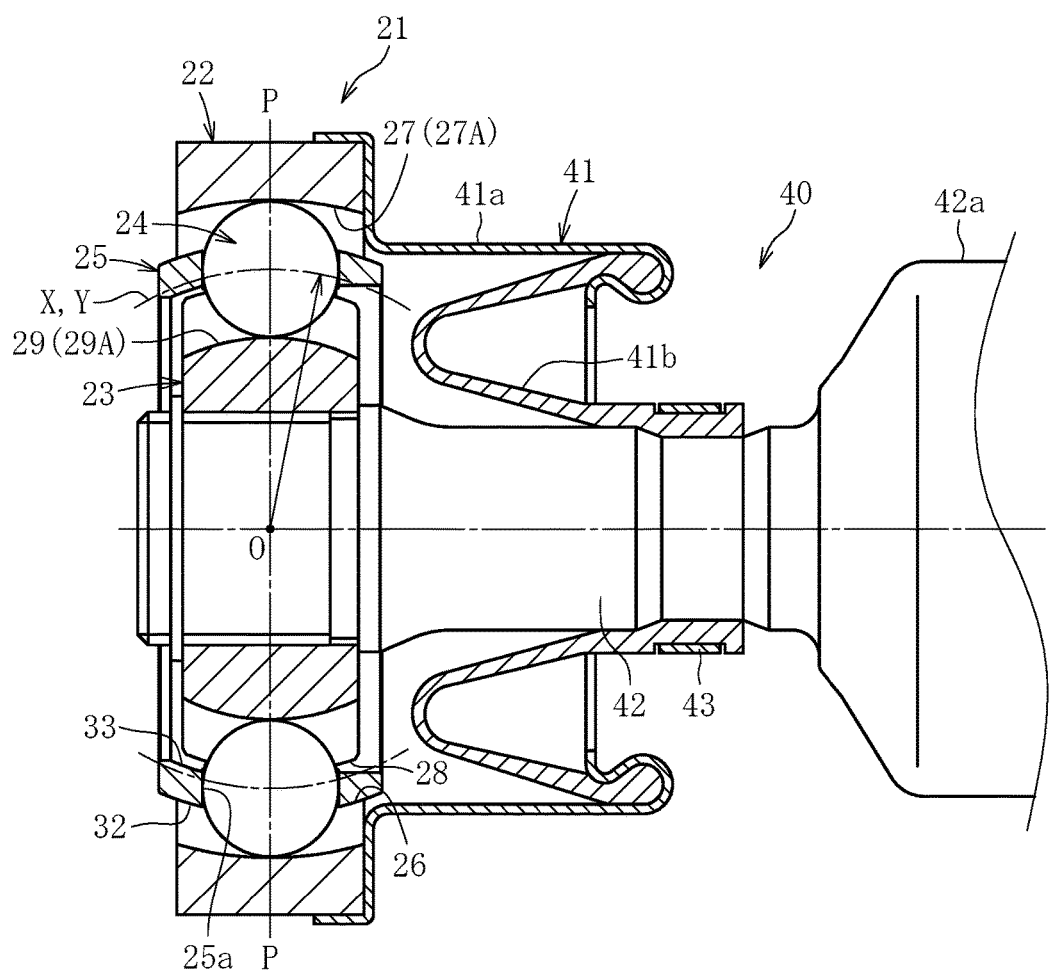
FIG. 19 is a schematic sectional view of a propeller shaft comprising the fixed type constant velocity universal joint illustrated in FIG. 13A.

FIG. 19 is a schematic sectional view of a propeller shaft comprising the fixed type constant velocity universal joint 21 according to the second embodiment described above. The propeller shaft 40 comprises the fixed type constant velocity universal joint 21, a shaft 42 comprising one axial end that is spline-coupled to a hole portion of the inner joint member 23, and a boot 41 mounted to an outer peripheral surface of the outer joint member 22 and an outer peripheral surface of the shaft 42 so as to prevent the lubricant (such as grease) sealed inside the joint from leaking to an outside. The shaft 42 comprises a large-diameter pipe portion 42a, and another fixed type or plunging type constant velocity universal joint (not shown) is coupled to the other axial end of the shaft 42. The boot 41 comprises a sealing ring 41a fixed to the outer peripheral surface of the outer joint member 22, and an elastic boot portion 41b comprising one end fixed to the sealing ring 41a and the other end mounted to the shaft 42 with a boot band 43. Note that, although detailed illustration is omitted, the sealing ring 41a of the boot 41 is fixed to the outer peripheral surface of the outer joint member 22, for example, by crimping.

The propeller shaft 40 uses the fixed type constant velocity universal joint 21 according to the second embodiment, and hence it is possible to attain a propeller shaft that is further suppressed in torque loss and heat generation, enhanced in efficiency, capable of effectively absorbing vibration with a small amplitude, and is lightweight and compact. An automobile having the propeller shaft 40 mounted therein is excellent in torque transmission efficiency, and hence can be suppressed in fuel consumption. In addition, factors of noise, vibration, and harshness (NVH) are decreased.

Figure 20A:
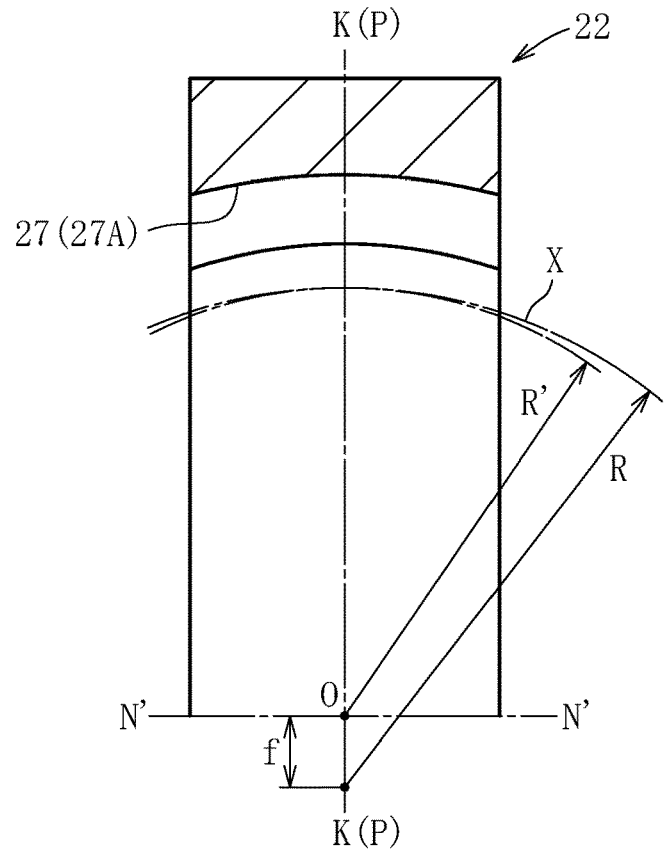
FIG. 20A is a partial vertical sectional view of an outer joint member to be used in a fixed type constant velocity universal joint according to a third embodiment of the present invention.
Figure 20B:
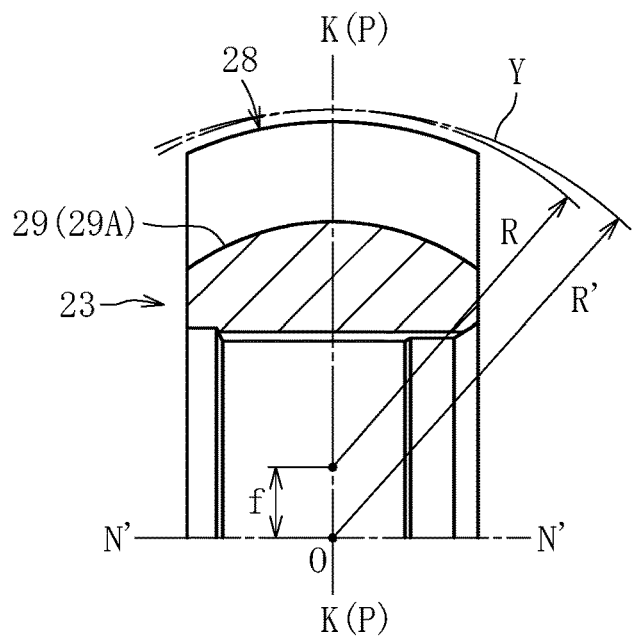
FIG. 20B is a partial vertical sectional view of an inner joint member to be used in a fixed type constant velocity universal joint according to a fourth embodiment of the present invention.

FIG. 20A is a partial sectional view of an outer joint member to be used in a fixed type constant velocity universal joint according to a third embodiment of the present invention, which is a modification example of the fixed type constant velocity universal joint 21 according to the second embodiment. FIG. 20B is a partial sectional view of an inner joint member to be used in a fixed type constant velocity universal joint according to a fourth embodiment of the present invention. Note that, similarly to FIG. 16, FIG. 20A is a partial sectional view of the outer joint member taken along the plane M (see FIG. 14A) including the ball raceway center line X of the track groove 27A and the joint center O. Similarly to FIG. 17, FIG. 20B is a partial sectional view of the inner joint member taken along the plane Q (see FIG. 15A) including the ball raceway center line Y of the track groove 29A and the joint center O. The constant velocity universal joints according to the third and fourth embodiments are different from the fixed type constant velocity universal joint 21 according to the second embodiment illustrated in FIG. 13 and the like mainly in that the curvature center of each of the track grooves (ball raceway center lines) is arranged at a position offset by "f" in a radial direction with respect to the joint axial line N-N (not offset in the axial direction with respect to the joint center O). That is, in the third and fourth embodiments, the curvature center of the ball raceway center line of each of the track grooves is offset by "f" in the radial direction in the joint center plane P including the perpendicular line K at the operating angle of 0°.

Under the state illustrated in FIG. 20A, when the curvature center of the ball raceway center line X of the track groove 27 (27A or 27B) of the outer joint member 22 is offset by "f" in the radial direction with respect to the joint axial line N-N, the groove depth of the track groove 27 (27A or 27B) of the outer joint member 22 can be increased (see reference symbols R and R' in FIG. 20A; note that, in this case, the groove depths of the track grooves 29 of the inner joint member 23 assembled to the inner periphery of the outer joint member 22 are decreased). On the other hand, under the state illustrated in FIG. 20B, when the curvature center of the ball raceway center line Y of the track groove 29 (29A or 29B) of the inner joint member 23 is offset by "f" in the radial direction with respect to the joint axial line N-N, the groove depth of the track groove 29 (29A or 29B) of the inner joint member 23 can be increased (see reference symbols R and R' in FIG. 20B; note that, in this case, the groove depths of the track grooves 27 of the outer joint member 22 having the inner periphery to which the inner joint member 23 is assembled are decreased). In short, as illustrated in FIG. 20A and FIG. 20B, when the curvature center of the ball raceway center line of each of the track grooves is offset in the radial direction with respect to the joint axial line N-N, the depths of the track grooves can be adjusted in accordance with the direction and the amount of the offset. Note that, other structural features are common to those of the fixed type constant velocity universal joint 21 according to the second embodiment, and hence detailed description thereof is omitted.

Although illustration is omitted, the same configuration (configuration in which the curvature centers of the track grooves are offset in the radial direction with respect to the joint axial line N-N) can be employed also in the fixed type constant velocity universal joint 1 according to the first embodiment, which is illustrated in FIG. 1 and the like.

FIG. 21A and FIG. 21B are illustrations of a fixed type constant velocity universal joint 21 according to a fifth embodiment of the present invention. The constant velocity universal joint 21 illustrated in FIG. 21A and FIG. 21B is an modification example of the fixed type constant velocity universal joint 21 according to the second embodiment illustrated in FIG. 13 and the like, and is structurally different from the fixed type constant velocity universal joint 21 according to the second embodiment in that the number of the balls is set to six. When the number of the balls is set to six as in this case, there are advantages in that the total number of components is smaller than that in the case where the number of the balls is set to eight, that satisfactory processability and assembly efficiency of the members can be achieved, and that a load capacity can be increased in accordance with increase in size of the balls.

Although illustration is omitted, the same configuration (configuration in which the number of the balls is set to six) can be employed also in the fixed type constant velocity universal joint 1 according to the first embodiment, which is illustrated in FIG. 1 and the like.

In the above description, the present invention is applied to the fixed type constant velocity universal joint comprising the eight or six balls. However, the present invention is also suitably applicable to a fixed type constant velocity universal joint comprising ten or twelve balls.

Further, the above description is directed to the case where the present invention is applied to the fixed type constant velocity universal joint having the track grooves arranged at a regular pitch in the peripheral direction. However, the present invention is also suitably applicable to a fixed type constant velocity universal joint having the track grooves arranged at an irregular pitch. Still further, in the above-mentioned fixed type constant velocity universal joint, the inclination angles $\gamma$ of the track grooves with respect to the joint axial line N-N are set equal to each other in all the track grooves, but the present invention is not limited thereto. As long as the inclination angles $\gamma$ of the paired track grooves of the outer joint member and the inner joint member are set equal to each other, the inclination angles $\gamma$ of the track grooves may be set unequal to each other. In short, it is only necessary that the inclination angles be set so that the axial forces of the balls are applied in a balanced manner as a whole to all the pockets of the cage. Further, in the above description, the present invention is applied to the fixed type constant velocity universal joint configured so that the track grooves and the balls are held in contact (angular contact) at a contact angle. However, the present invention is not limited thereto. The present invention is also suitably applicable to a fixed type constant velocity universal joint configured so that the track grooves and the balls are held in circular contact by forming the track grooves into an arc shape in horizontal cross section.

The present invention is not limited to the embodiments described above, and as a matter of course, may be carried out in various other embodiments without departing from the spirit of the present invention. The scope of the present invention is defined in the claims, and encompasses meaning of equivalents described in the claims and all modifications within the scope of claims.

REFERENCE SIGNS LIST 1, 21 fixed type constant velocity universal joint
2, 22 outer joint member
3, 23 inner joint member
4, 24 ball
5, 25 cage
6, 26 spherical inner peripheral surface
7, 27 track groove
8, 28 spherical outer peripheral surface
9, 29 track groove
12, 32 spherical outer peripheral surface
13, 33 spherical inner peripheral surface
20 rear-wheel drive shaft
40 propeller shaft
K perpendicular line
M plane (plane including ball raceway center line)
N joint axial line
O joint center
P joint center plane (joint center plane at operating angle of) 0°)
Q plane (plane including ball raceway center line)
X ball raceway center line
Y ball raceway center line
$\gamma$ inclination angle
$\theta$ operating angle
$\Delta T$ ball track clearance
$\Delta T_{ai}$ axial clearance (formed by ball track clearance)
$\Delta T_{ao}$ axial clearance (formed by ball track clearance)
$\Delta S_i$ spherical clearance
$\Delta S_o$ spherical clearance
$\Delta S_{ia1}$ axial clearance (formed between inner joint member and cage)
$\Delta S_{ia2}$ axial clearance (formed between inner joint member and cage)

The invention claimed is:

1. A fixed type constant velocity universal joint, comprising:
   an outer joint member having a spherical inner peripheral surface in which a plurality of track grooves are formed so as to extend in an axial direction of the outer joint member;
   an inner joint member having a spherical outer peripheral surface in which a plurality of track grooves are formed so as to be paired with the plurality of track grooves of the outer joint member;
   balls for transmitting torque,
      the balls being interposed between the plurality of track grooves of the outer joint member and the plurality of track grooves of the inner joint member, which are paired with each other; and
   a cage having:
      a spherical outer peripheral surface fitted to the spherical inner peripheral surface of the outer joint member; and
      a spherical inner peripheral surface fitted to the spherical outer peripheral surface of the inner joint member,
   wherein the plurality of track grooves of the outer joint member are each formed into an arc shape having a curvature center that is prevented from being offset in the axial direction with respect to a joint center, the plurality of track grooves of the outer joint member being inclined in a peripheral direction of the outer joint member with respect to a joint axial line and adjacent pairs of the plurality of track grooves of the outer joint member in the peripheral direction having inclination directions opposite to each other,
   wherein the plurality of track grooves of the inner joint member are formed so as to be mirror-image symmetrical with the plurality of paired track grooves of the outer joint member with respect to a joint center plane at an operating angle of 0°,
   wherein the plurality of track grooves of the outer joint member and the plurality of track grooves of the inner joint member each have a length corresponding to a maximum operating angle of 30°, and
   wherein to allow absorption of axial vibration inputted to the fixed type constant velocity universal joint:
      the outer joint member and the inner joint member allow relative displacement therebetween in the axial direction;
      an axial clearance $\Delta S_{ia1}$ is formed between the inner joint member and the cage to axially separate the inner joint member and the cage from each other on an opening side of the outer joint member under a non-load state, and an axial clearance $\Delta Sia2$ is formed between the inner joint member and the cage to axially separate the inner joint member and the cage from each other on an interior side of the outer joint member under the non-load state; and each of the axial clearances $\Delta Sia1$ and $\Delta Sia2$ is larger than a sum of an axial clearance $\Delta Tao$, which is formed by a ball track clearance between one of the balls and an associated one of the track grooves of the outer joint member under the non-load state, and an axial clearance $\Delta Tai$, which is formed by a ball track clearance between one of the balls and an associated one of the track grooves of the inner joint member under the non-load state.

2. The fixed type constant velocity universal joint according to claim 1, wherein the curvature center of each of the plurality of track grooves of the outer joint member and a curvature center of each of the plurality of track grooves of the inner joint member are arranged on the joint axial line.

3. The fixed type constant velocity universal joint according to claim 1, wherein the curvature center of each of the plurality of track grooves of the outer joint member and a curvature center of each of the plurality of track grooves of the inner joint member are arranged at positions offset in a radial direction of each of the outer joint member and the inner joint member with respect to the joint axial line.

4. The fixed type constant velocity universal joint according to claim 1, wherein a number of the balls is set to six, eight, ten, or twelve.

5. A fixed type constant velocity universal joint, comprising:

an outer joint member having a spherical inner peripheral surface in which a plurality of track grooves are formed so as to extend in an axial direction of the outer joint member;

an inner joint member having a spherical outer peripheral surface in which a plurality of track grooves are formed so as to be paired with the plurality of track grooves of the outer joint member;

balls for transmitting torque,
the balls being interposed between the plurality of track grooves of the outer joint member and the plurality of track grooves of the inner joint member, which are paired with each other; and a cage having:
a spherical outer peripheral surface fitted to the spherical inner peripheral surface of the outer joint member; and
a spherical inner peripheral surface fitted to the spherical outer peripheral surface of the inner joint member, wherein the plurality of track grooves of the outer joint member are each formed into an arc shape having a curvature center that is prevented from being offset in the axial direction with respect to a joint center, the plurality of track grooves of the outer joint member being inclined in a peripheral direction of the outer joint member with respect to a joint axial line and adjacent pairs of the plurality of track grooves of the outer joint member in the peripheral direction having inclination directions opposite to each other, wherein the plurality of track grooves of the inner joint member are formed so as to be mirror-image symmetrical with the plurality of paired track grooves of the outer joint member with respect to a joint center plane at an operating angle of 0°, wherein the plurality of track grooves of the outer joint member and the plurality of track grooves of the inner joint member each have a length corresponding to a maximum operating angle of 20°, and wherein to allow absorption of axial vibration inputted to the fixed type constant velocity universal joint:

the outer joint member and the inner joint member allow relative displacement therebetween in the axial direction;

an axial clearance $\Delta Sia1$ is formed between the inner joint member and the cage to axially separate the inner joint member and the cage from each other on an opening side of the outer joint member under a non-load state, and an axial clearance $\Delta Sia2$ is formed between the inner joint member and the cage to axially separate the inner joint member and the cage from each other on an interior side of the outer joint member under the non-load state; and each of the axial clearances $\Delta Sia1$ and $\Delta Sia2$ is larger than a sum of an axial clearance $\Delta Tao$, which is formed by a ball track clearance between one of the balls and an associated one of the track grooves of the outer joint member under the non-load state, and an axial clearance $\Delta Tai$, which is formed by a ball track clearance between one of the balls and an associated one of the track grooves of the inner joint member under the non-load state.

6. The fixed type constant velocity universal joint according to claim 5, wherein the curvature center of each of the plurality of track grooves of the outer joint member and a curvature center of each of the plurality of track grooves of the inner joint member are arranged on the joint axial line.

7. The fixed type constant velocity universal joint according to claim 5, wherein the curvature center of each of the plurality of track grooves of the outer joint member and a curvature center of each of the plurality of track grooves of the inner joint member are arranged at positions offset in a radial direction of each of the outer joint member and the inner joint member with respect to the joint axial line.

8. The fixed type constant velocity universal joint according to claim 5, wherein a number of the balls is set to six, eight, ten, or twelve.

* * * * *